US008087587B2

(12) United States Patent
Vinogradov et al.

(10) Patent No.: US 8,087,587 B2
(45) Date of Patent: Jan. 3, 2012

(54) DUAL LASER AIMING PATTERNS FOR AN IMAGING-BASED BAR CODE READER

(75) Inventors: Igor Vinogradov, New York, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 180 days.

(21) Appl. No.: 12/343,712

(22) Filed: Dec. 24, 2008

(65) Prior Publication Data

US 2010/0155481 A1     Jun. 24, 2010

(51) Int. Cl.
*G06K 7/10* (2006.01)
(52) U.S. Cl. .................................. 235/462.21
(58) Field of Classification Search ............. 235/462.21
See application file for complete search history.

(56) References Cited

U.S. PATENT DOCUMENTS

| | | | | |
|---|---|---|---|---|
| 6,340,114 | B1* | 1/2002 | Correa et al. | 235/462.22 |
| 6,454,167 | B1* | 9/2002 | Barkan et al. | 235/462.01 |
| 6,616,046 | B1* | 9/2003 | Barkan et al. | 235/462.29 |
| 2003/0226895 | A1* | 12/2003 | Havens et al. | 235/462.22 |
| 2006/0043187 | A1* | 3/2006 | He et al. | 235/462.2 |
| 2008/0296385 | A1 | 12/2008 | Vinogradov | |
| 2009/0088203 | A1* | 4/2009 | Havens et al. | 455/556.1 |
| 2010/0155485 | A1* | 6/2010 | Tan et al. | 235/462.42 |

FOREIGN PATENT DOCUMENTS

EP     1669907     6/2006

OTHER PUBLICATIONS

International Search Report and Written Opinion dated Apr. 8, 2010 in related case PCT/US2009/068560.
International Preliminary Report on Patentability dated Jul. 7, 2011 in related case PCT/US2009/068560.

* cited by examiner

*Primary Examiner* — Daniel Hess
*Assistant Examiner* — David Tardif
(74) *Attorney, Agent, or Firm* — Nong-Qiang Fan

(57) ABSTRACT

An aiming pattern assembly for an imaging-based bar code reader including: a laser assembly laterally offset from an imaging lens assembly optical axis, the laser assembly including a first laser light source and a second laser light source; and a focusing lens defining an optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis and the second laser light source being laterally offset from the focusing lens optical axis resulting in the second beam path crossing the imaging lens assembly optical axis in a near working range.

28 Claims, 13 Drawing Sheets

DUAL LASER AIMING PATTERNS FOR AN IMAGING-BASED BAR CODE READER

FIELD OF THE INVENTION

The present invention relates to an aiming pattern assembly for an imaging-based bar code reader and, more particularly, to an aiming pattern assembly for an imaging-based bar code reader including dual laser aiming patterns, a first aiming pattern suitable for near range imaging and a second aiming pattern suitable for far range imaging of target bar codes.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Universal Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems typically include a modular imaging camera assembly. The camera assembly includes a sensor array and an imaging lens assembly to focus illumination from a field of view (FV) onto the sensor array. The sensor array may be a charge coupled device (CCD) array, a complementary metal oxide semiconductor (CMOS) array, or other imaging sensor array having a plurality of photosensitive elements (photosensors) defining image pixels.

The camera assembly typically also includes an illumination apparatus or system comprising light emitting diodes (LEDs) or other light source directs illumination toward a target object, e.g., a target bar code. Light scattered/reflected from the target bar code is focused through a system of one or more lens of the imaging lens assembly onto the sensor array. Thus, if a target bar code is within a field of view (FV) of the imaging lens assembly, an image of the target bar code is focused or projected onto the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

Imaging-based bar code readers which are portable, as opposed to a fixed mounted or stationary reader, typically have housings that designed to be held by a user in his or her hand and pointed at a target bar code by the user to image and decode the target bar code. To facilitate the user appropriately pointing or aiming the bar code reader at the target bar code, a camera assembly may be provided with an aiming pattern assembly which generates a visible aiming pattern. The generated aiming pattern may be simply visible dot projected approximately in the middle or at a center point of the field of view FV of the imaging system. Alternately, the generated aiming pattern may be a visible crosshair aiming pattern with the vertex of the crosshair pattern projected approximately at a center point of the field of view FV of the imaging system. Yet another alternative would be for the generated aiming pattern to comprise a rectangular or circular pattern of visible illumination whose center is projected approximately at the center point of the field of view FV of the imaging assembly and whose outer periphery approximates a periphery of the field of view FV. This is typically referred to as a block-type aiming pattern. A block-type aiming pattern indicates to the user the extent of the field of view FV so that the user can appropriately aim the reader housing such that the target bar code is within the bounds of the imaging assembly field of view FV.

The sensor array is typically located in alignment with the imaging lens assembly optical axis such that a light receiving surface of the sensor array orthogonally intersects the optical axis. Accordingly, the aiming pattern assembly is typically offset from an optical axis of the imaging lens assembly. If the aiming pattern assembly were collinear with the optical axis, the aiming pattern assembly would block the scattered/reflected light from the field of view FV and prevent the light from being focused onto the sensor array. Because the aiming pattern assembly is not coaxially aligned with the imaging lens assembly within the camera assembly housing, this results in parallax between the optical axis of the imaging lens assembly and a center of an aiming pattern beam line generated by the aiming pattern assembly.

Because of the parallax between the imaging lens assembly optical axis and the aiming pattern beam line, at most, there will be one target distance at which the aiming pattern beam line intersects or coincides with a center point of the field of view FV. At all other target distances, the aiming pattern beam line will be shifted or laterally offset with respect to a center point of the field of view FV and the further from the intersection point one moves, the greater will be the lateral offset due to parallax. For example, if the aiming pattern beam line intersects the center point of the field of view FV at a short or near range target distance, as the target distance beyond the intersection point, the offset between the aiming pattern beam line and the center point of the field of view FV will increase.

If the aiming pattern assembly is positioned such that the aiming pattern beam line is substantially parallel to the imaging lens optical axis, then there will be a constant lateral offset due to parallax. At near range target distances, the magnitude of the constant lateral offset may be so great as to be detrimental to the ability to read lengthy target bar codes wherein the target bar code is of such a length as to occupy nearly the entire field of view FV and even a slight lateral offset between aiming pattern projected onto the target bar code and the center point of the field of view FV would be sufficient to cause a portion of the target bar code to extend beyond the bounds of the field of view FV. Thus, a designer of the camera assembly is faced with having to compromise by either: 1) choosing to align the aiming pattern beam path to intersect or coincide with the center point of the imaging system field of view FV at a near target distance and, therefore, introduce a lateral offset at a far target distance wherein the offset increases as the distance between the target bar code and the bar code reader increases; 2) align the aiming pattern beam path to interest or coincide with the center point of the imaging system field of view FV at a far target distance and, therefore, introduce a lateral offset at a near target distance wherein the offset increases as the distance between the target bar code and the reader decreases; or 3) accept a constant lateral offset at all target distances.

As reader imaging systems are improved to have greater and greater working ranges (WR), that is, the ability to read target bar codes over distances from a few centimeters from the front of the imaging system to distances of several meters from the imaging system, the impact of the parallax error on the lack of congruency between the aiming pattern and the field of view FV is exacerbated. As used herein, near or short range imaging refers to imaging wherein the target distance between a front of the imaging lens assembly and the target bar code is approximately 10 inches or less and far or long range imaging refers to imaging wherein the target distance is more than 10 inches. For example, one way to increase the effective working range WR of an imaging system is move from a fixed focus lens system to a variable focus lens system. In a fixed focus system, the field of view FV and the working range WR of the imaging system is fixed. The working range WR of an imaging system is a distance range in front of or forward of the imaging lens assembly within which a target bar code, may be successfully imaged and decoded by the imaging system decoding circuitry.

The working range WR and field of view FV require a user to move the bar code reader relative to the target bar code such that the target bar code is within the field of view FV and within the working range WR of the imaging system for successful decoding of the imaged target bar code. At the near and far limits of the working range WR, there is a problem with blurriness, that is, poor resolution of the imaged target bar code. A variable focus lens system addresses the blurriness problem at the limits of the working range WR by providing for readjustment/refocusing of the lens system. This readjustment/refocusing of the lens system facilitates obtaining an in-focus image of a target bar code focused onto the sensor array, thus, mitigating blurriness at the limits of the working range WR. A disclosure of a variable focus lens assemblies is presented in U.S. published application no. US 2008-0296385 A1, published Dec. 4, 2008 (patent application Ser. No. 11/756,052, filed May 31, 2007) to Vinogradov and entitled "Variable Focus Imaging Lens Assembly For An Imaging-Based Bar Code Reader". The aforesaid U.S. published application no. US 2008-0296385 is assigned to the assignee of the present invention and is incorporated herein in its entirety by reference.

One potential resolution of the aiming pattern/imaging lens assembly parallax issue involves the use of a fold element such as a beamsplitter inserted along the optical axis of the imaging lens assembly. The beamsplitter allows an image of the target bar code within the field of view of the imaging lens assembly to pass through the beamsplitter and the imaging lens assembly and be focused onto the sensor array. At the same time, the beamsplitter reflects and projects focused laser light from the aiming pattern assembly forward along the optical axis. In this way, a center point of the aiming pattern is substantially collinear or congruent with the optical axis of the imaging lens assembly and the center point of the field of view FV.

However, fold elements such as beamsplitters require valuable space within the imaging camera assembly housing. Thus, given the small size of imaging camera assemblies used in imaging-based bar code readers, space constraints simply may not allow sufficient space for a beamsplitter element to be positioned forward of the imaging lense assembly. Additionally, there is an energy loss with regard to the aiming pattern because of the use of the beamsplitter.

Moreover, for autofocus and autozoom imaging lens systems, it is desirable for the aiming pattern to be utilized to quickly determine target range or distance such that suitable focus may be rapidly achieved during an imaging session. Typically, an auto-focusing system controls the focusing of autofocus/autozoom optics based on a target range. The focusing system utilizes the range information to rapidly focus the imaging system, that is, to rapidly move one or more movable optic elements to achieve a suitable image quality of an imaged target bar code.

What is needed is an aiming pattern assembly for an imaging-base bar code reader that provides for reduced lateral offset due to parallax between the aiming pattern assembly optical axis and the imaging lens assembly optical axis under both short range and long range portions of the working range WR of the imaging system. What is also needed is an aiming pattern assembly for an imaging-base bar code reader that provides for multiple aiming patterns that more accurately correspond to the field of view FV over the working range WR of the imaging system. What is also needed is an aiming pattern assembly that can be utilized by an auto-focus system for determining target range.

SUMMARY

In one aspect, the present invention features an imaging system for an imaging-based bar code reader adapted to image a target bar code within a field of view of the imaging system, the imaging system comprising:

a sensor array and an imaging lens assembly defining an imaging lens optical axis and focusing light from the field of view onto the sensor array, the imaging system defining a working range over which a target bar code within the field of view is capable of being imaged and decoded, the working range being subdivided into a near working range and a non-overlapping far working range, the near working range being closer to the imaging lens assembly and the far working range being further from the imaging lens assembly; and an aiming pattern assembly including a laser assembly laterally offset from the imaging lens assembly optical axis, the laser assembly including a first laser light source and a second laser light source, the aiming pattern assembly including a focusing lens defining a focusing lens optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis resulting in the first beam path being substantially parallel to the imaging lens assembly optical axis, and the second laser light source being laterally offset from the focusing lens optical axis resulting in the second beam path intersecting the imaging lens assembly optical axis in the near working range.

In one exemplary embodiment, the laser assembly comprises a dual laser package wherein the first and second laser light sources are mounted a common cantilever. In one exemplary embodiment, the second laser light source is a laser chip generating illumination at a wavelength of approximately 400-470 nanometers (nm.) and the first laser light source is a laser chip generating illumination at a wavelength of approximately 630-670 nanometers (nm.).

In one exemplary embodiment, the focusing lens has a 3 millimeter (mm.) focal length and the second laser light source is laterally offset from the focusing lens optical axis by 300 micrometers (um.) to achieve a parallax angle of substantially 0.1 radians at a range of 100 mm from the imaging lens assembly.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
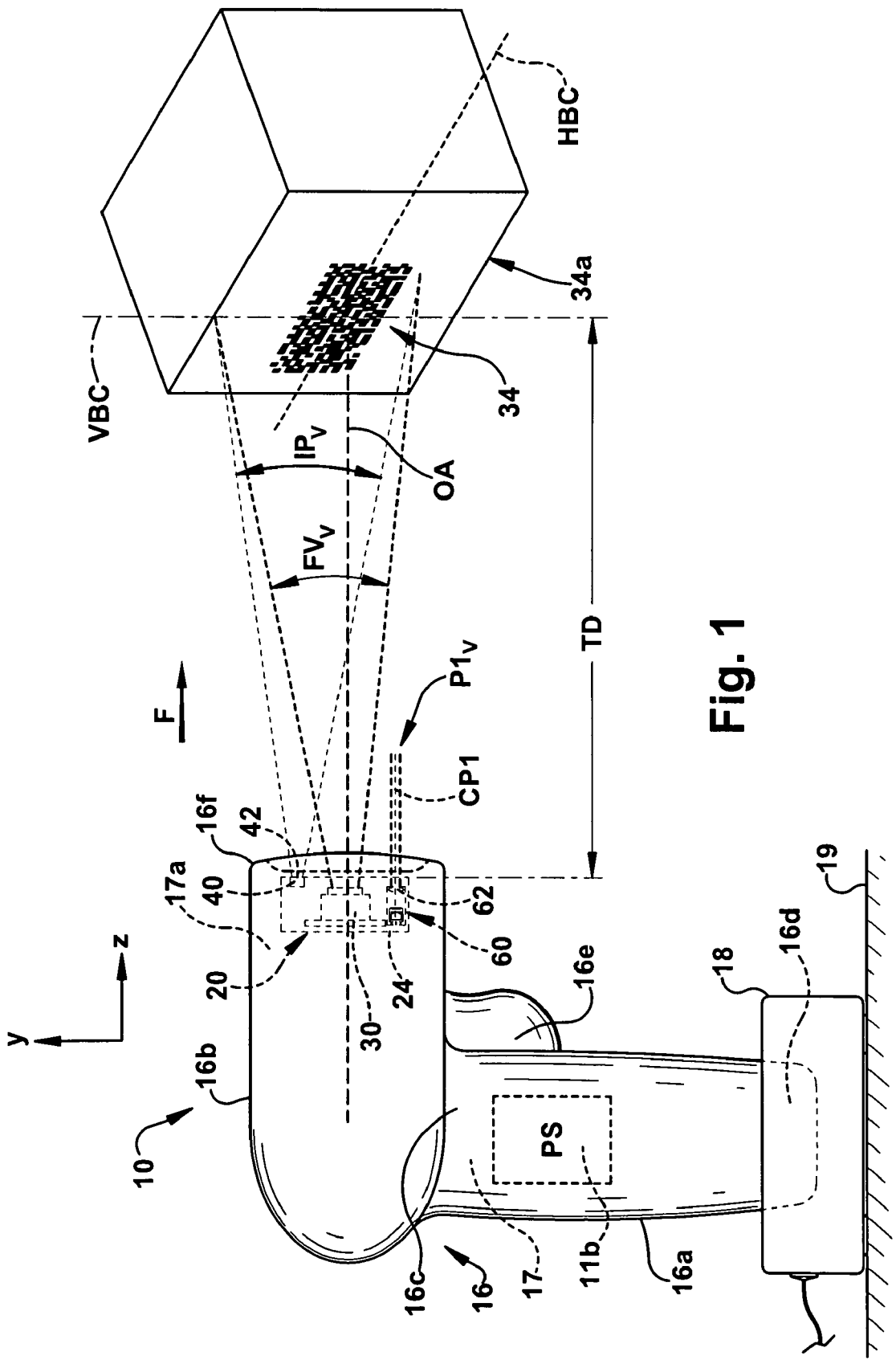
FIG. 1 is a schematic side elevation view of an exemplary embodiment of an imaging-based bar code reader of the present invention.
Figure 2:
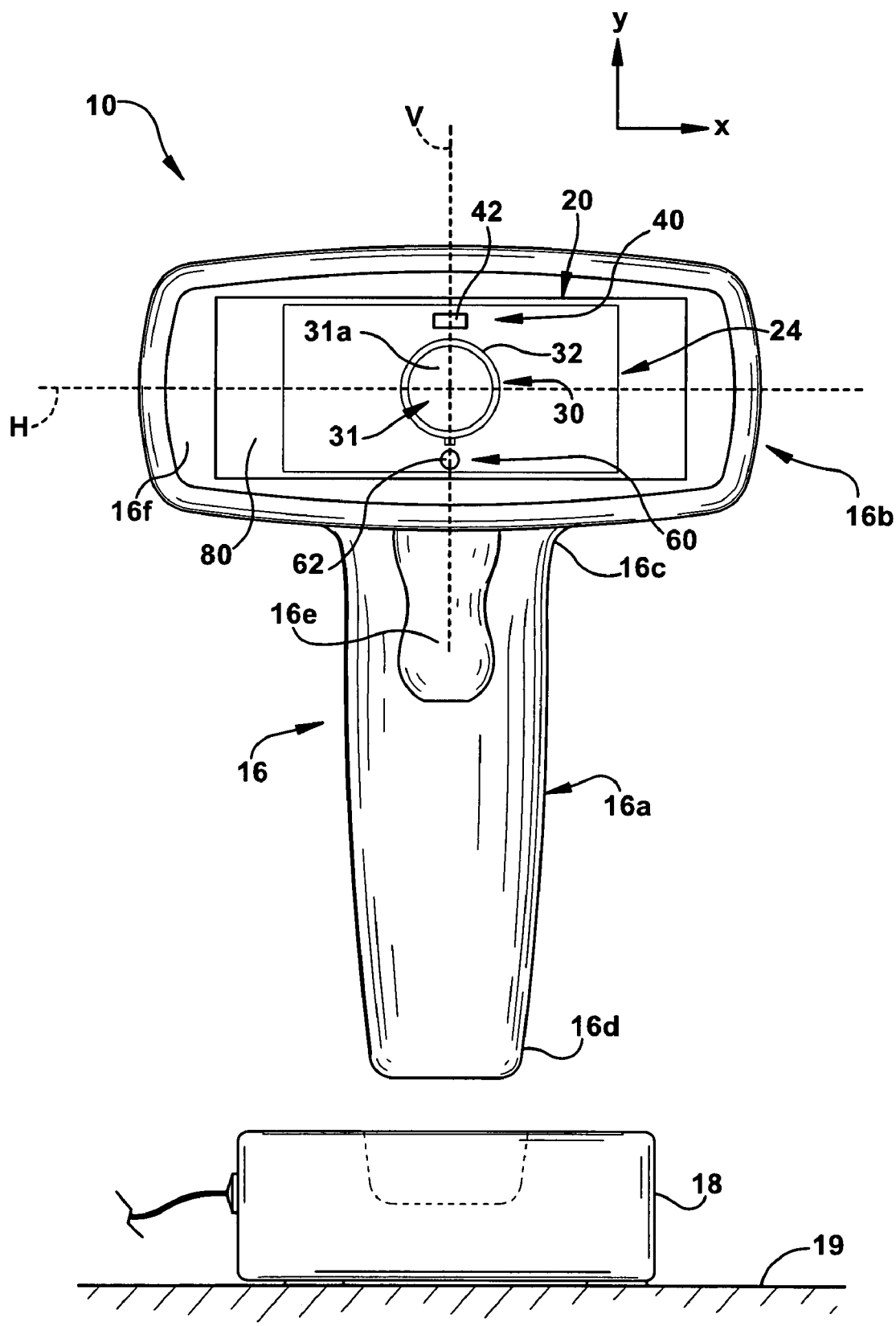
FIG. 2 is a schematic front elevation view of the bar code reader of FIG. 1.
Figure 3:
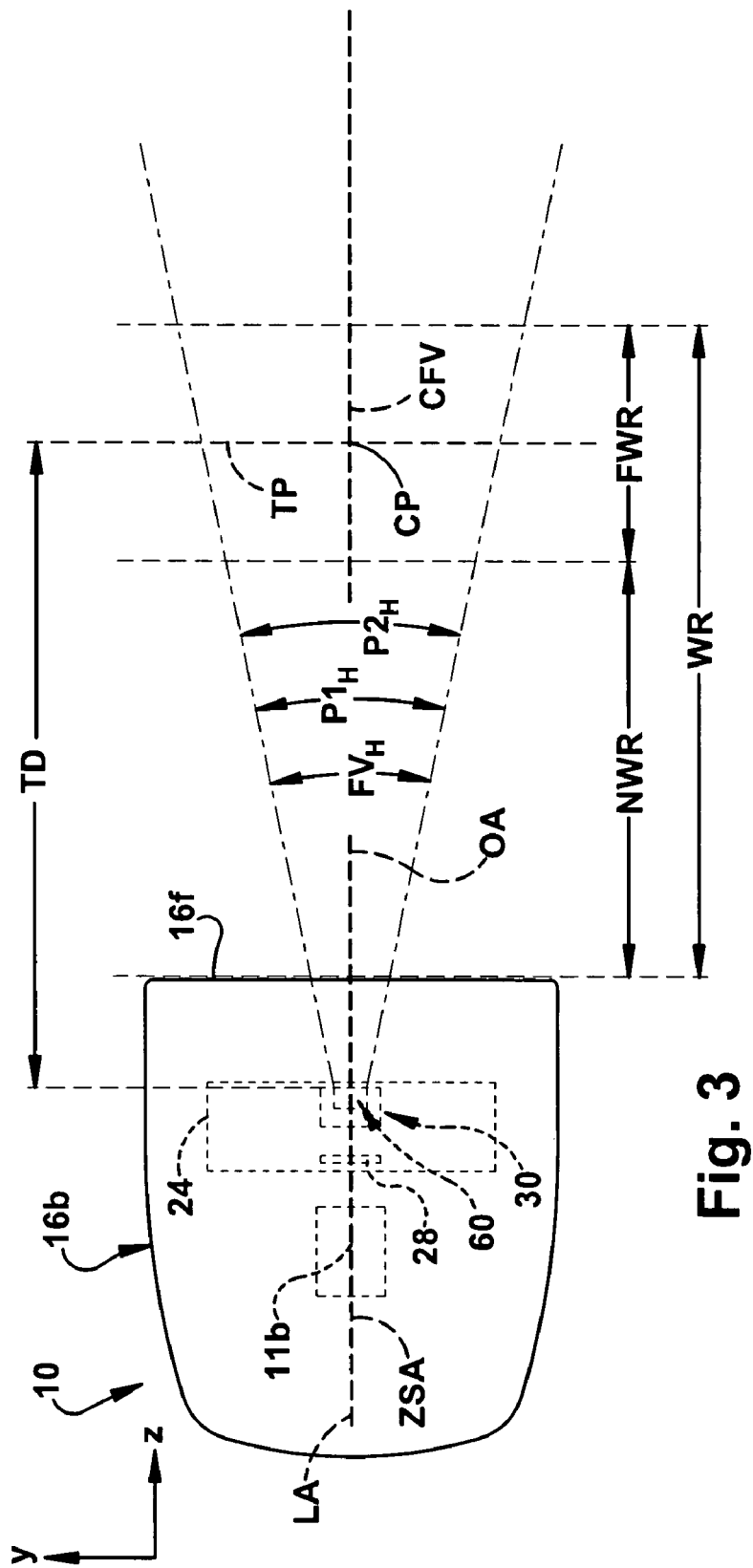
FIG. 3 is a schematic top plan view of the bar code reader of FIG. 1.

A first exemplary embodiment of an imaging-based bar code reader of the present invention is shown schematically at 10 in FIGS. 1-9. The bar code reader 10 includes an imaging system 12 and a decoding system 14 mounted in a housing 16. The reader 10 is capable of reading, that is, imaging and decoding bar codes. The imaging system 12 is adapted to capture image frames of a field of view FV of the imaging system 12 and the decoding system 14 is adapted to decode encoded indicia within a captured image frame 82. The housing 16 supports circuitry 11 of the reader 10, including the imaging and decoding systems 12, 14, within an interior region 17 of the housing 16. Typically, the target bar code 34 is imprinted on or affixed to a product or product package 34a.

The imaging system 12 comprises a modular scan engine or imaging camera assembly 20 and associated imaging circuitry 22 supported within a housing 24. The camera assembly 20 includes a sensor array 28 and an imaging lens assembly 30. The imaging lens assembly 30 focuses or projects illumination scattered/reflected from the field of view FV onto the sensor array 28. The camera assembly housing 24 also supports an illumination assembly 40 for illuminating the field of view FV of the camera assembly and an aiming pattern assembly 60 to facilitate a user properly aiming the housing 16 at a target object, such as a target bar code 34.

Figure 6:
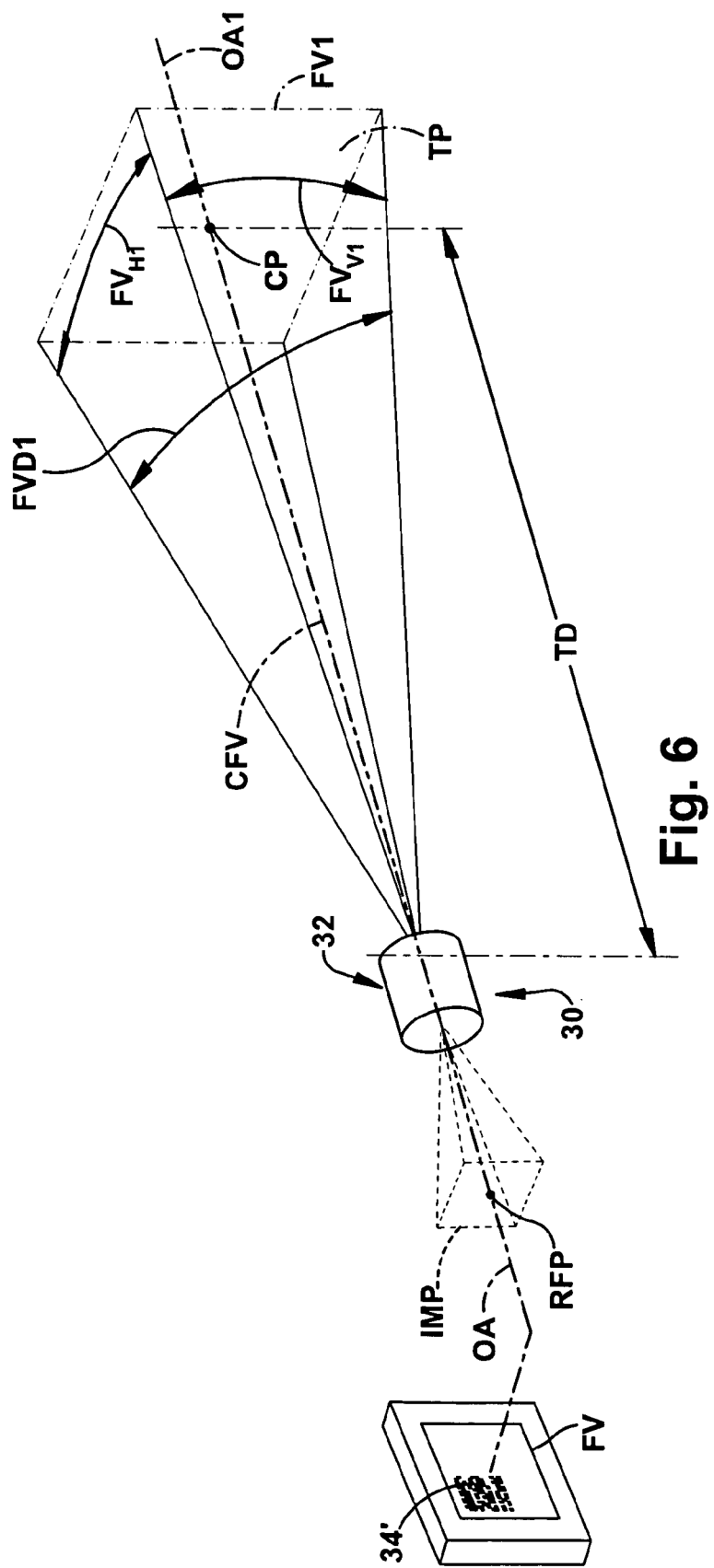
FIG. 6 is a schematic perspective view of an imaging lens assembly of the bar code reader of FIG. 1 illustratively showing a field of view and a projection of an image plane of the imaging lens assembly onto a sensor array.

Advantageously, as will be discussed below, the aiming pattern assembly 60 of the present invention generates a plurality of aiming patterns P1, P2 to compensate for parallax or lateral offset between the aiming pattern assembly 60 and an optical axis OA of the imaging system 12. Stated another way, there is a lateral offset between the aiming pattern assembly and a center line of the field of view CFV (FIG. 6). The field of view FV of the imaging system 12 may be characterized by a series of geometric center points CP of the field of view FV forming the center line CFV through the field of view FV. Generally, the field of view center line CFV will be substantially collinear with the optical axis OA of the imaging lens assembly 30. The field of view FV of the imaging system may also be characterized as comprising a series of target planes TP (FIGS. 3 and 6), each having a geometric center point CP. That is, at each target distance TD from the imaging lens assembly 30, there is a target plane TP that corresponds to the field of view FV at that particular target distance. The geometric center points CP comprises the field of view center line CFV.

In one exemplary embodiment, the first aiming pattern P1 is defined a beam path BP1 having a constant lateral offset from the optical axis OA. The first aiming pattern P1 is especially suited for imaging a target bar code 34 at a far distance from the reader 10. The second aiming pattern P2 is defined by a beam path BP2 angles toward and intersects or crosses the optical axis OA and the field of view center line. The second aiming pattern P2 is especially suited for imaging a target bar code 34 at a near distance from the reader 10. When it is stated herein that that the beam path "intersects" the optical axis OA, it is meant that the beam path BP2 crosses the optical axis OA, that is, when the second aiming pattern beam line BL2 is viewed from the side elevation view of FIG. 4, the beam line BL2 crosses from below to above the optical axis OA, thus, intersecting the optical axis OA.

The camera assembly 20 may, but does not have to be, modular in that the housing 24 may be removed or inserted as a unit into the reader 10, allowing the ready substitution of camera assemblies having different imaging characteristics, e.g., camera assemblies having different working ranges and different fields of view.

A working range WR is a distance range in front of or forward (in a direction F in FIG. 1) of the camera assembly 20 within which a target object of interest, such as a target bar code 34, may be successfully imaged and decoded. By way of example and not intending to limit the present invention, a working range WR may range from a distance of a few centimeters or less in front of the imaging lens assembly 30 (which may, for example, be substantially coincident with a front optically transparent window 80 (FIG. 4) of the reader 10 to allow for contact imaging of a target bar code 34 wherein the bar code is in contact with the transparent window 80 to a distance of several meters, depending upon lighting conditions, the size and contrast of the target bar code 34, etc. The working range WR may be divided into two nonoverlapping ranges or distances, a near distance or near working range NWR and a far distance or far working range FWR. The near working range NWR or near distance, as defined herein, is a near portion of the working range which is approximately 10 inches or less from the imaging lens assembly 30. The far working range FWR or far distance, as defined herein, is a far portion of the working range which is approximately more than 10 inches.

The imaging camera assembly 20 may be a board camera in which a vertically oriented printed circuit board 24a of the housing 24 supports the imaging lens assembly 50 and the sensor array 30. The imaging lens assembly 60 may be a fixed focus or a variable focus assembly. The imaging lens assembly 30 includes a plurality of lenses 31 and/or an aperture plate 31a supported within a lens holder 32. The lens assembly 30 comprises one or more fixed lenses and/or one or more variable focus lens. The lens holder 32 is, in turn, supported by a shroud 33 which prevents ambient illumination from reaching the sensor array 28. The imaging lens assembly 30 defines the optical axis OA. As best seen in FIG. 6, the optical axis OA of the imaging lens assembly 30 will generally be coincident with a geometrical center point CP of the field of view FV at any given target distance TD. Stated another way, if the center point CP of the field of view FV is found for any target distance, the field of view FV at that target distance defines a target plane TP, the center point CP will be substantially on the optical axis OA.

The sensor array 28 is enabled during an exposure period to capture an image of a target object, such as a target bar code 34, within the field of view FV of the imaging system 12. The field of view FV of the imaging system 12 is a function of both the configuration of the sensor array 28 and the imaging lens assembly 30 and the distance and orientation between the array 28 and the lens assembly 30.

In one exemplary embodiment, the imaging system 12 is a two dimensional (2D) imaging system and the sensor array 28 is a 2D sensor array. It should be understood, however, that the present invention is equally applicable to a linear or one dimensional imaging system having a 1D linear sensor array.

The imaging system field of view FV (shown schematically in FIG. 6) includes both a horizontal and a vertical field of view components, FVH, FVV, at any given target distance TD. A diagonal angle of the field of view is shown at FVD in FIG. 6. Of course, as the target distance TD increases, the measured size of the field of view FV will increase, however, the angular field of view, as indicated by the diagonal angular field of view FVD, for example FVD=30°, will remain constant regardless of target distance TD. The sensor array 28 is primarily adapted to image 1D and 2D bar codes, for example, a 2D bar code as shown in FIG. 1 which extends along a horizontal axis HBC and a vertical axis VBC and includes multiple rows of indicia comprising a multi-row, multi-column array of dark bars and white spaces. However, one of skill in the art would recognize that the present invention is also applicable to image postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 18 positioned on a substrate 19 such as a table or sales counter. The scanning head 16b supports the camera assembly 20 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 18 and a target object such as the target bar code 34 (FIG. 1) is brought within the field of view FV of the reader's imaging system 12 in order to have the reader 10 read, that is, image and decode, the target bar code 34. The imaging system 12 is typically always on or operational in the fixed position mode to image and decode any target bar code presented to the reader 10 within the field of view FV. The docking station 36 is plugged into an AC power source and provides regulated DC power to circuitry 11 of the reader 10. Thus, when the reader 10 is in the docking station 18 power is available to keep the imaging system 12 on continuously.

In the hand-held mode, the housing 14 is removed from the docking station 18 so the reader 10 can be carried by an operator or user and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

Figure 5:
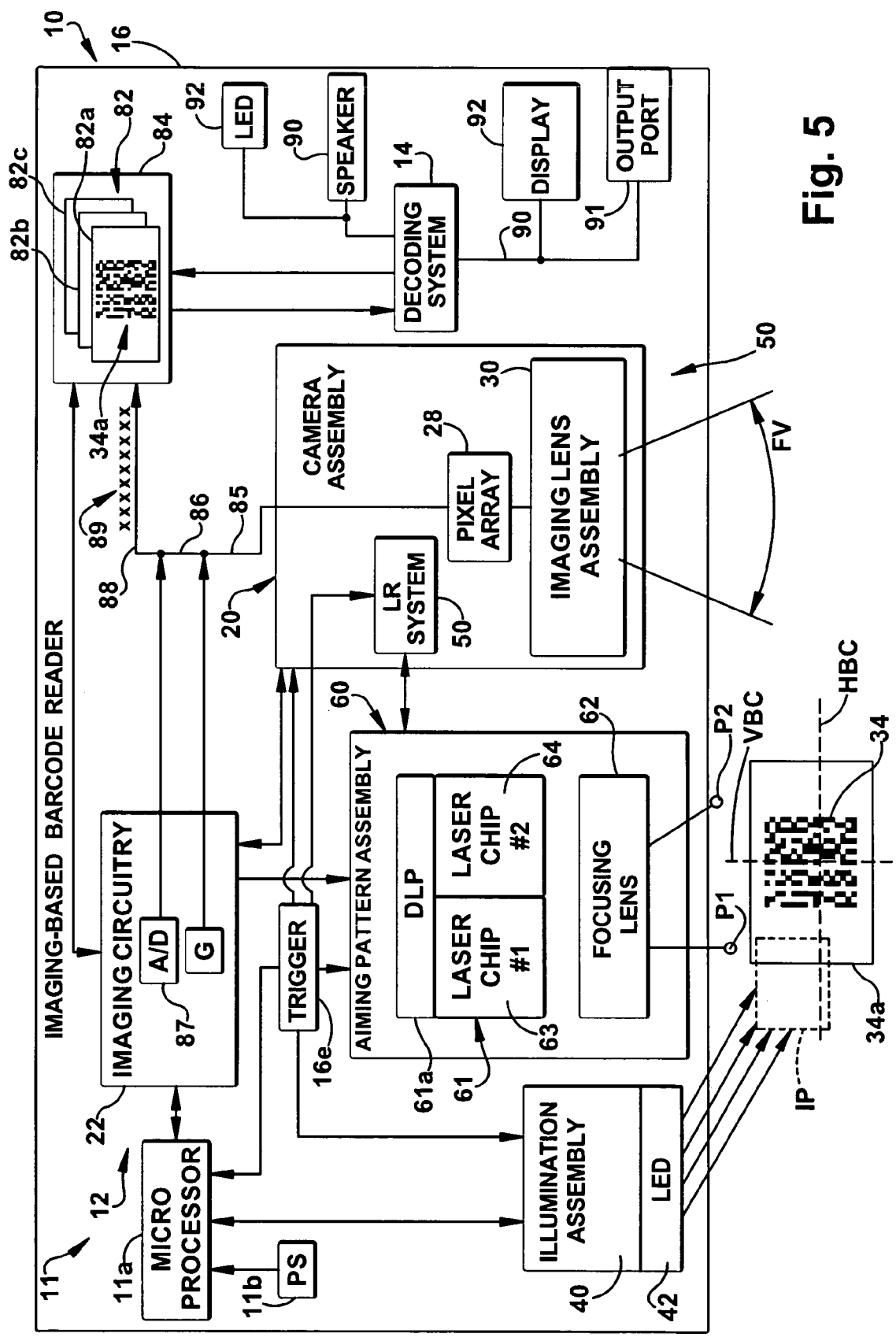
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the modular camera assembly 20, on flash read only memory (ROM), on an application specific integrated circuit (ASIC), or any combination thereof.

The imaging circuitry 22 may be disposed within, partially within, or external to the camera assembly housing 24. A back end of the housing 24 may comprise a printed circuit board 24a, which forms part of the imaging circuitry 22 and extends vertically to also support the illumination assembly 40 and the aiming pattern assembly 60 (best seen in FIG. 4).

The camera housing 24 is supported within the scanning head interior region 17a in proximity to the optically transparent exit window 80 (FIG. 4) defining a portion of a front wall 16f of the scanning head 16b. The window 80 is transparent to the aiming pattern assembly 60 and the illumination assembly 40 and is oriented such that its horizontal axis is substantially parallel to the scanning head horizontal axis H. The vertical axis of the window 80 may be tilted slightly from the vertical axis V to avoid specula reflection. Specula reflection would occur if, for example, a virtual image of the illumination assembly 40 were to be projected by the exit window 80 within the field of view FV of the imaging system 12.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

Figure 4:
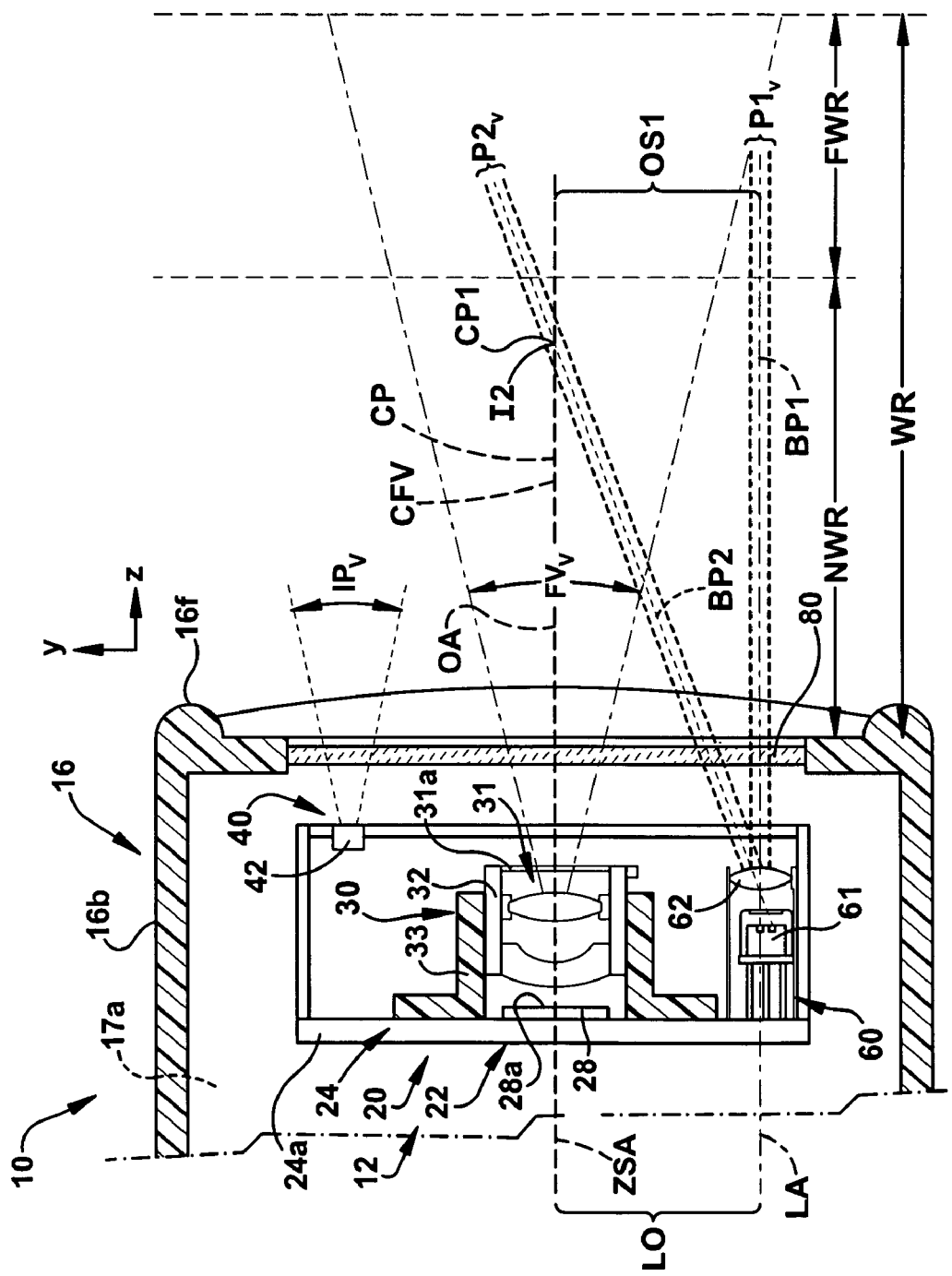
FIG. 4 is a schematic view partly in section and partly in side elevation of a camera assembly of an imaging assembly of the bar code reader of FIG. 1.

The illumination-receiving pixels of the sensor array 28 define a light receiving sensor array surface 28a (best seen in FIG. 4). The sensor array 28 is secured to the printed circuit board 24a, in parallel direction for stability. The sensor array surface 28a is substantially perpendicular to the optical axis OA of the lens assembly 52, that is, a z axis (labeled ZSA in FIG. 4) that is perpendicular to the sensor array surface 28a would be substantially parallel to the optical axis OA of the imaging lens assembly 30. The pixels of the sensor array surface 28a are disposed substantially parallel to the horizontal axis H of the scanning head 16b.

As is best seen in FIG. 4, the imaging lens assembly 30 focuses light reflected and scattered from the target bar code 34 onto the sensor array surface 28a of the sensor array 28. Thus, the lens assembly 30 focuses an image 34' (shown schematically in FIG. 6) of the target bar code 34 (assuming it is within the field of view FV) onto the array of pixels comprising the sensor array 28. The imaging lens assembly 30 is configured such that a suitable in-focus image of an object within the field of view FV over the entirety of the working range WR is focused onto the sensor array surface 28a. Typically, the sensor array surface 28a is positioned with respect to the imaging lens assembly 30 approximately at an image plane IMP or back focal plane BFP of the imaging lens assembly 30.

Illumination Apparatus 40

The bar code reader 10 includes the illumination apparatus 40 to illuminate the field of view FV so that the image 34' of the target bar code 34 projected onto the sensor array 28 is suitable for decoding. The illumination apparatus 40 may include one or more illumination sources 42 (FIGS. 4 and 5) such as surface mount LEDs (or a cold cathode lamp (CFL)) which is energized to generate an illumination pattern IP (shown schematically in FIG. 5) that fills or substantially coincides with the field of view FV of the imaging system 12. It should be understood that depending on the specifics of the reader and the environmental conditions under which the reader will be used, an illumination assembly 40 may be utilized having more than one illumination source, one or more focusing lens, an one or more apertures positioned between the LEDs and the focusing lenses.

Operation of Imaging and Decoding Systems 12, 14

When actuated to read the target bar code 34, the imaging system 12 captures a series of image frames 82 comprising image frames 82a, 82b, 82c, etc. (shown schematically in FIG. 5) which are stored in a memory 84. Assuming the target bar code 34 is within the field of view FV, each image frame 82 includes a digitized image 34a (FIG. 5) of the target bar code 34. The digitized bar code image 34a corresponds to the projected image 34' of the target bar code 34 focused by the imaging lens assembly 30 onto the sensor array surface 28a. The decoding system 14 attempts to decode the digitized bar code 34a present in one or more captured image frames 84.

Electrical signals are generated by reading out of some or all of the pixels of the sensor array 28 after an exposure period. After the exposure time has elapsed, some or all of the pixels of sensor array 28 are successively read out thereby generating an analog signal 85 (FIG. 4). In some sensors, particularly CMOS sensors, all pixels of the sensor array 28 are not exposed at the same time, thus, reading out of some pixels may coincide in time with an exposure period for some other pixels.

The analog image signal 85 represents a sequence of photosensor voltage values, the magnitude of each value representing an intensity of the reflected light received by a photosensor/pixel during an exposure period. The analog signal 85 is amplified by a gain factor, generating an amplified analog signal 86. The imaging circuitry 22 further includes an analog-to-digital (A/D) converter 87. The amplified analog signal 78 is digitized by the A/D converter 87 generating a digitized signal 88. The digitized signal 88 comprises a sequence of digital gray scale values 89 typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 89 of the digitized signal 88 are stored in the memory 84. The digital values 89 corresponding to a read out of the sensor array 28 constitute the image frame 82, which is representative of the image projected by the focusing lens 30 onto the sensor array 28 during an exposure period. If the field of view FV of the imaging lens assembly 30 includes the target bar code 34, then a digital gray scale value image 34a of the target bar code 34 would be present in the image frame 82.

The decoding circuitry 14 then operates on the digitized gray scale values 89 of the image frame 82 and attempts to decode any decodable image within the image frame, e.g., the digitized, imaged target bar code 34a. If the decoding is successful, decoded data 90, representative of the data/information coded in the bar code 34 is then output via a data output port 91 and/or displayed to a user of the reader 10 via a display 92. Upon achieving a good "read" of the bar code 34, that is, the imaged bar code 34a was successfully imaged and decoded, a speaker 93 and/or an indicator LED 94 is activated by the bar code reader circuitry 11 to indicate to the user that the target bar code 34 has successfully read, that is, the target bar code 34 has been successfully imaged and the digitized, imaged bar code 34a has been successfully decoded. If decoding is unsuccessful, a successive image frame of the series of image frame 82 is selected and the decoding process is repeated until a successful decode is achieved.

First Exemplary Embodiment of Aiming Pattern Assembly 60

As noted previously, parallax causes an aiming pattern to be non-congruent with respect to a center point CP of the field of view FV of the imaging system and the optical axis OA of the imaging system. This parallax problem is illustrated in prior art FIGS. 12A and 12B. Assume a prior art imaging system IM has a field of view FV and a working range WR. Further assume a prior art aiming pattern assembly AP generates an aiming pattern P. As can be seen in FIG. 11A, because the imaging system IM and the aiming pattern assembly AP are not coaxial with respect to the vertical direction Y, a longitudinal axis LA of the aiming pattern assembly AP is offset (offset labeled OF in FIG. 12A) from an optical axis OA of the imaging system IM. The imaging system IM has a field of view FV (which in the side elevation view of FIG. 12B is seen as a vertical plane FVV—vertical field of view). Assume that a center line through successive center points CP of the field of view FV is a line labeled CFV in FIGS. 12A & 12B. Generally, the center line CFV of the field of view FV would be collinear with the optical axis OA of the imaging system IM.

Figure 12B:
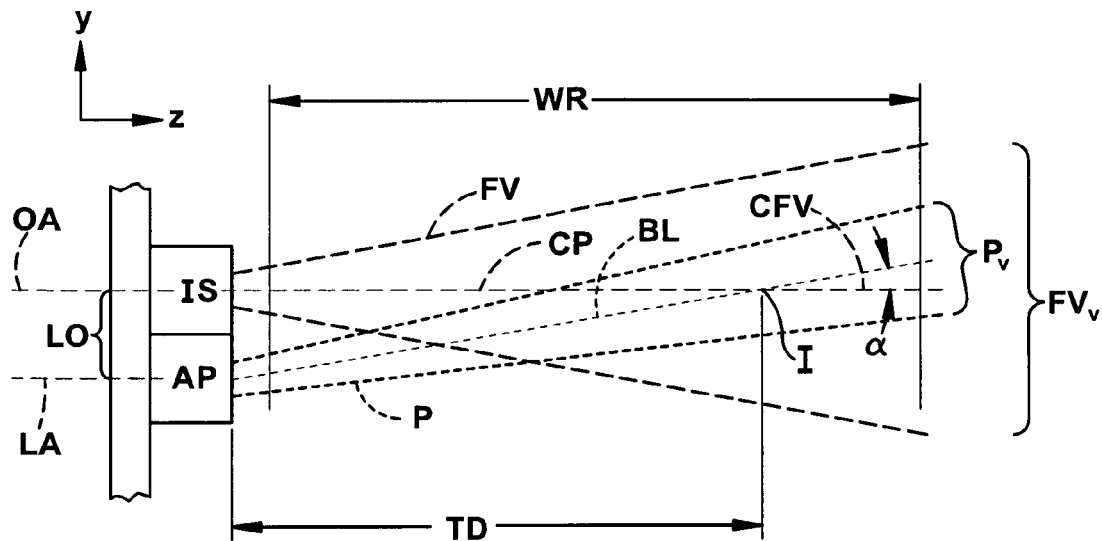
FIGS. 12A and 12B are schematic representation of parallax between an imaging system and an aiming pattern assembly of a prior art imaging-based bar code reader.
Figure 12A:
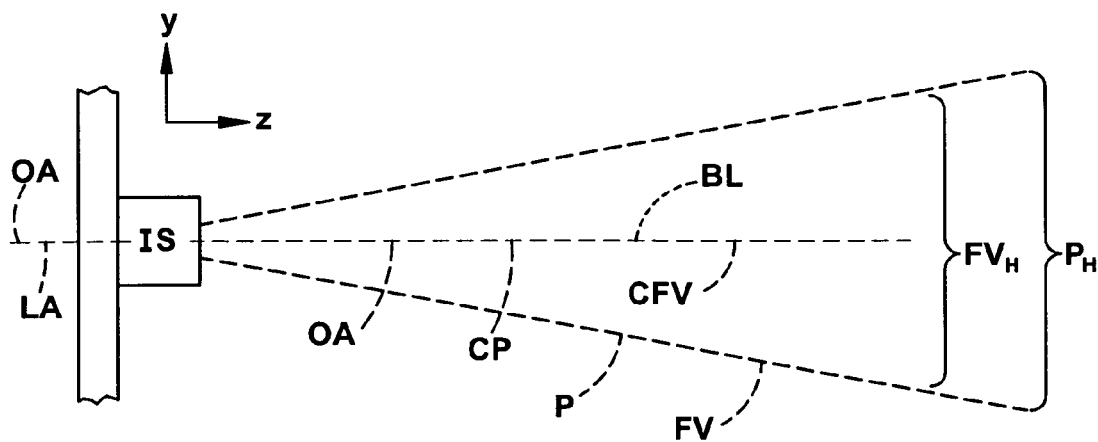

In the particular example of FIG. 12B, the imaging system IM and the aiming pattern assembly AP are offset in a vertical direction, that is, with respect to or along the Y axis. As is shown in FIG. 12A, it is assumed that the imaging system IM and the aiming pattern assembly are not offset with respect to the horizontal or X axis. If on the other hand, the imaging system IM and the aiming pattern assembly AP were offset with respect to the X axis but aligned with respect to the Y axis (as if FIGS. 12A & 12B were swapped), then the parallax with be with respect to the X axis and none with respect to the Y axis.

Returning to FIG. 12B, as can be seen, because of the offset OF and the resulting parallax with respect to the Y axis, a center or beam line BL of the aiming pattern P generated by the aiming pattern assembly AP is not congruent with a center line CFV of the imaging system field of view FV, indeed, the aiming pattern center line CP is at an angle α with respect to the field of view center line CFV. In the schematic example shown in FIG. 11, the beam line BM of the aiming pattern P intersects the center line CFV of the field of view at point I within the working range WR, that is, at a target distance TD from the imaging system IS within the working range WR. However, if the target bar code is closer to or further from the imaging system IS than the target distance TD, as can be seen, the beam line center line of the aiming pattern CP diverges from the center line CFV of the field of view FV.

Assuming the intersection point I is near the middle of the working range WR, the amount of divergence is greatest near the limits of the working range WR. If on the other hand the intersection point I is at the far limit of the working range WR, the maximum parallax would be at the near limit of the working range WR. It should be appreciated that, in actuality, because the target distance TD may be on the order of 1 meter (or more) from the imaging system IS, the parallax or divergence angle α is much smaller than is shown schematically in FIG. 11. Nevertheless, divergence of the beam center line BL of the aiming pattern P and the center line CFV of the field of view FV is still problematic because it leads to inaccuracy in aiming of the reader by the user which, especially at the far limit of the working range can result in poor reader performance, i.e., no successful reading of target bar code if reader is not aimed such that target bar code is within the imaging system field of view FV.

To complete the analysis regarding FIG. 12A, since there is no offset between the beam line of the aiming pattern assembly AP and the imaging system IM with respect to the X axis, the center line CP of the aiming pattern would be aligned in the vertical direction with the center line CFV of the field of view FV. This is seen in FIG. 12A.

One approach to reducing the parallax angle α would be to reduce the offset between the imaging system IS and the aiming pattern assembly AP, however, the extent of such reduction in offset is limited by the physical footprint or size of the components of the imaging system and the aiming pattern assembly. Moreover, the imaging system IS and the aiming pattern assembly AP cannot be coaxial with respect to the optical axis because one would block the other, that is, if the aiming pattern assembly AP was positioned along the optical axis OA in front of the imaging system IS, the imaging system would be blocked from receiving light from the field of view FV. Similarly if the imaging system IS were positioned in front of the aiming pattern assembly AP, the aiming pattern would be blocked by the sensor of the imaging system IS. Thus, there will always be some offset at least with respect to one axis orthogonal to the imaging system optical axis OA and, therefore, some degree of parallax, between the imaging system optical axis OA and the aiming pattern assembly AP. As mentioned previously, a beamsplitter would address this problem. However, typically, because of the small size of the camera assembly and the limited space available within the camera assembly housing, providing sufficient space for such a beamsplitter is problematic, thus, it is not a favored or an ideal solution.

Advantageously, the aiming pattern assembly or system 60 of the present invention generates at least two aiming patterns P1, P2 (best seen in FIGS. 4, 7, 8 and 9) to aid the user in aiming the reader 10 at the target bar code 34 when using the reader 10 in the hand-held mode. The first aiming pattern P1 is especially suited and is used for imaging at a far distance from the reader 10 and the second aiming pattern P2 is especially suited and is used for imaging at a near distance from the reader.

Figure 8:
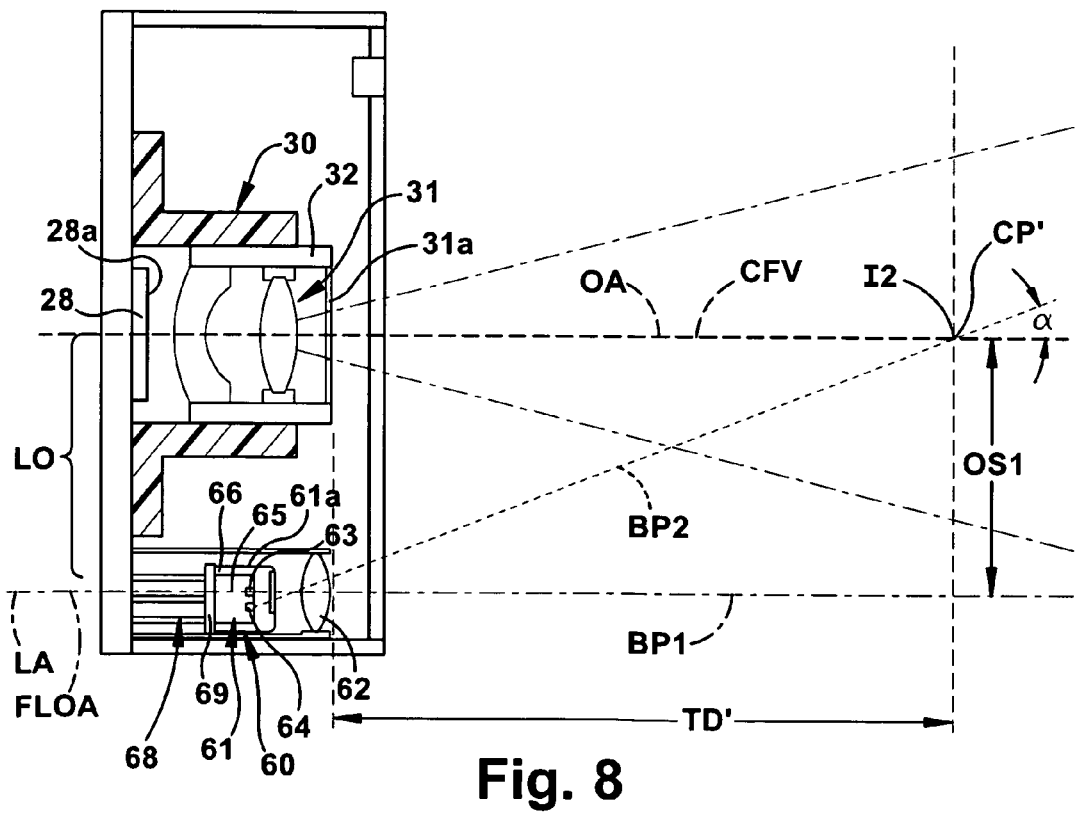
FIG. 8 is a schematic side elevation view of a camera assembly of the bar code reader of FIG. 1.

The use of two aiming patterns P1, P2 mitigates the problem of parallax which is caused by the lateral offset LO (FIGS. 4 and 8) between the imaging lens assembly 30 and the aiming pattern assembly 60 in the Y direction. As can be seen in FIGS. 4 and 8, the lateral offset LO is defined as the difference between a longitudinal axis LA through the aiming pattern assembly 60 and the optical axis OA of the imaging lens assembly 30

In the X direction, it is assumed that there is no lateral offset and no parallax because the imaging lens assembly 30 is aligned with the aiming pattern assembly 60 when viewed with respect to the X direction. As can be seen schematically in FIGS. 3, 4 and 8, when viewed from a top plan view, the longitudinal axis LA of the aiming pattern assembly 60 would be aligned with optical axis OA of the imaging lens assembly 30.

Figure 7:
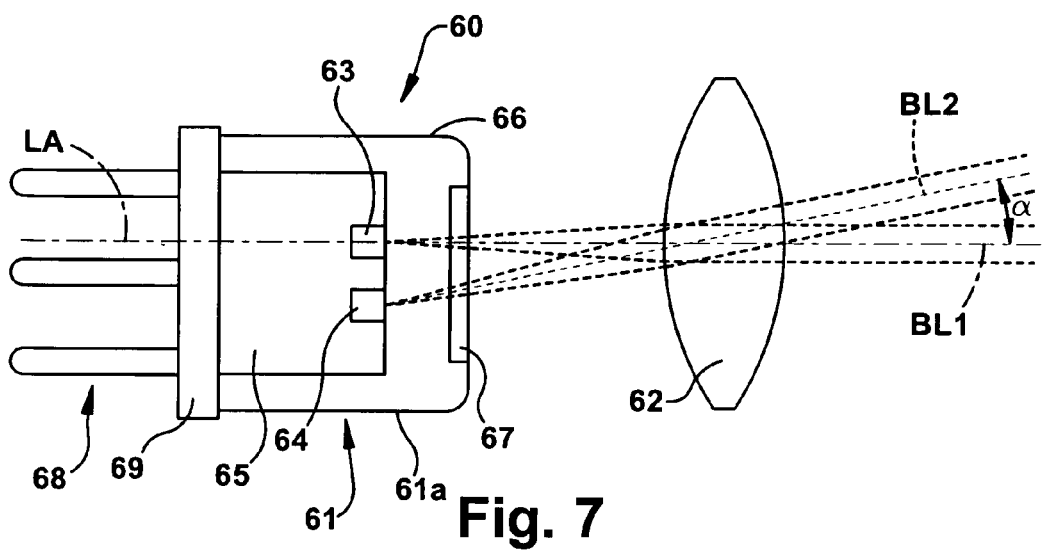
FIG. 7 is a schematic side elevation view of a laser package with dual laser chips mounted on a cantilever.

The aiming pattern assembly 60 includes a multi-beam laser assembly 61 and a focusing lens 62. The multi-beam laser assembly 61 is laterally offset from the imaging lens assembly optical axis OA. In one exemplary embodiment, the multi-beam laser assembly 61 comprises a dual laser package 61a that includes a first laser light source 63 and a second laser light source 64 mounted on a cantilever 65. The cantilever 65 is supported within a glass enclosure 66 including an exit window 67 (FIG. 7). Electrical connections 68 extend from a base 69 of the dual laser package 61. An example of a dual laser package would be Rohm's 660/780 nm. dual wave low power laser (model no. RLD2WMN) manufactured by Rohm Co., Ltd. Kyoto, Japan (www.rohnm.comn). Another example would be Sanyo's 655/790 nm. two wavelength laser diode (model no. DL-3115-167) manufactured by Tottori Sanyo Electric Co., Ltd., LED Business Unit, 5-318, Tachikawa, Tottori 680-8634 Japan.

The laser light sources 63, 64 comprise respective laser chips. By way of example, the first laser light source 63 for aiming pattern P1 may be a laser chip emitting visible illumination at a wavelength in the range of 630-670 nanometer (nm.) and the second laser light source 64 for aiming pattern P2 may be a laser chip emitting visible illumination at a wavelength in the range of 400-470 nm. In one embodiment, the first laser chip 63 emits visible radiation at a wavelength of approximately 405 nm. and the second laser chip 64 emits visible radiation at a wavelength of approximately 650 nm.

The 405 nm. wavelength illumination of aiming pattern P2 provides good stimulation to the human eye indoors where fluorescent and incandescent light are used. The 405 nm. illumination does not have much content in the blue-violet spectrum and, therefore, gives good contrast for efficient aiming of the reader 10 at a target bar code 34 for imaging indoors and for short range imaging. The 650 nm. wavelength illumination of the first aiming pattern P1 is suitable for imaging in an outdoor environment at target distances within the far working range FWR.

It should be understood, of course, that depending on the characteristics of the target bar codes 34 to be read and the environmental conditions under which the imaging will occur (ambient lighting conditions, contrast of target bar code against its background, dust, etc.), the aiming patterns P1, P2 may be generated by laser light sources 63, 64 generating the same wavelengths of visible illumination, or wavelengths different than 650 nm. or 405 nm.

In an alternate embodiment, instead of a dual laser package 61a that includes physically separate first and second laser chips 63, 64, a single monolithic dual laser chip mounted in a single package may be utilized. Such a monolithic chip includes a single laser chip that can generate differing wavelengths of light from spatially separated active areas. Since the laser light sources are spaced apart, in effect, all of the discussion regarding the dual laser package 61a is equally applicable to a monolithic dual laser chip mounted in a single package. This configuration is often referred to as a laser array. Alternately, the first and second laser light sources 63, 64 may be a pair of conventional laser diodes mounted on a common substrate or on separate substrates.

The aiming pattern assembly focusing lens 62 is positioned proximate to the laser assembly 61 to focus both laser light sources 63, 64 and defines a focusing lens optical axis FLOA (FIG. 8) which is congruent and coincident with the longitudinal axis LA of the aiming pattern assembly 60. The focusing lens 62 may be, for example, a positive power convex lens. The focusing lens 62 focuses the laser light generated by the first laser light source 63 to generate the first aiming pattern P1 which traverses along a first beam path or line BL1 for imaging a target bar code 34 within the far working range FWR. The first laser light source 63 is in alignment with the focusing lens optical axis FLOA and the longitudinal axis of the aiming pattern assembly LA.

The focusing lens 62 also focuses the laser light generated by the second laser light source 64 to generate the second aiming pattern P2 which traverses along a second beam path or line BL2 for imaging a target bar code 34 within the near working range NWR. As can best be seen in FIG. 9, the second laser light source 64 is laterally offset a distance d from the first laser light source 63, the focusing lens optical axis FLOA, and the longitudinal axis LA of the aiming pattern assembly 60.

Offsetting the second laser light source 63 from the focusing lens optical axis FLOA provides desired angular parallax of the beam line BL2 of the second aiming pattern P2 such that the beam line BL2 intersects the field of view center line CFV. Specifically, as best seen in FIG. 8, at a target distance TD' and at a target plane TP', the beam line BL2 defining the second aiming pattern P2 intersects center point CP' of the imaging lens field of view FV at intersection point I2 within the near working range NWR.

On the other hand, since the first laser light source 62 is aligned with the optical axis FLOA of the focusing lens 62, the beam line BL1 defining the first aiming pattern P1 is substantially parallel to the imaging lens assembly optic axis OA. Therefore, the beam line BL1 is substantially parallel to the field of view center line CFV. The parallax angle α of the first aiming pattern is substantially zero, α=0°. As such, there is a constant lateral offset (labeled OS1 in FIGS. 4 and 6) between the beam line BL1 and the imaging lens assembly optical axis OA regardless of the target distance TD and there is the same constant lateral offset OS1 between the beam line BL1 and the field of view center line CFV. Stated another way, there is the same constant lateral offset OS1 between the beam line BL1 and any given center point CP of the field of view FV.

Figure 10:
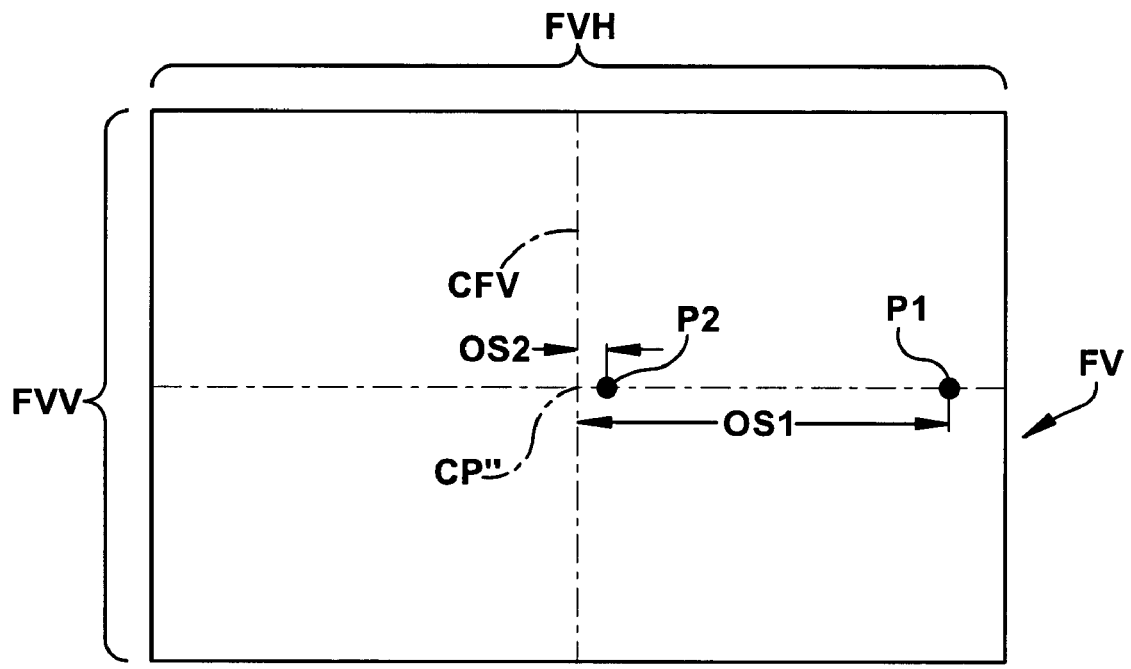
FIG. 10 is a schematic representation of the field of view at a near imaging distance and illustrating projections of first and second aiming patterns of the first exemplary embodiment of the aiming pattern assembly onto the imaging distance field of view.
Figure 11:
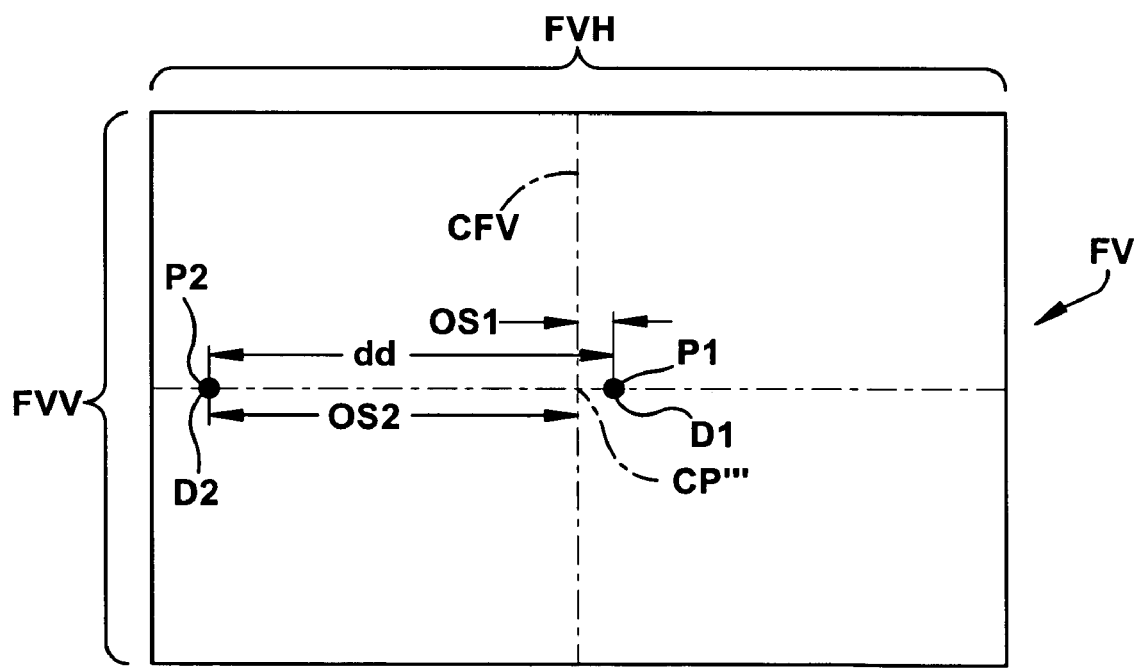
FIG. 11 is a schematic representation of the field of view at a far imaging distance and illustrating projections of first and second aiming patterns of the first exemplary embodiment of the aiming pattern assembly onto the far distance field of view.

As can be seen in FIGS. 10 and 11, at a field of view FV within the near working range NWR (FIG. 10), the field of view FV is relatively small and the parallax or offset OS2 between the second aiming pattern P2 and the center point CP''' of the field of view FV is negligible or relatively small compared to the offset OS1 between the first aiming pattern P1 and the center point CP'''. Indeed, at the target distance of TD' FIG. 8, the second aiming pattern P2 intersects or is coincident with the center point CP', thus, the parallax or offset OS2 would be OS2=0.

By comparison, at a field of view FV within the far working range FWR (FIG. 11), the field of view FV is relatively large and the constant parallax or offset OS1 between the first aiming pattern P1 and the center point CP''', which is a constant value such as OS1=10 mm., is negligible or relatively small compared to the offset OS2 between the second aiming pattern P2 and the center point CP'''. The reason for this reversal is that, as the target distance TD increases beyond TD', the parallax angle α causes the offset OS2 of the second aiming pattern P2 with respect to the imaging lens assembly optical axis OA and the field of view center line CFV to become larger and larger. Since the target distance TD' where the second aiming pattern beam line BL2 intersects the field of view center line CFV is by design within the near working range NWR, in the far working range region FWR, the offset OS2 of aiming pattern P2 is much larger than the constant value offset OS1 of the aiming pattern P1.

Accordingly, the first aiming pattern P1 is especially suited for aiming the reader 10 at a target bar code 34 at a far imaging distance such as within the far working range FWR because the constant lateral offset OS1 between the beam line BL1 and the field of view center line CFV is of minimal effect at large target distances TD and corresponding large fields of view FV. The second aiming pattern P2 is especially suited for aiming the reader 10 at a target bar code 34 at a near imaging distance such as within the near working range NWR where the constant lateral offset OS1 between the beam line BL1 and the field of view center line CFV would be detrimental to proper aiming at small target distances TD and corresponding small fields of view FV. Indeed, the error of offset OS1 might cause mis-aiming of the reader 10 so severe as to prevent complete imaging of a large target bar code 34 at near target distances TD. The converse is true for the error of offset OS2 which might cause mis-aiming of the reader 10 so severe as to prevent complete imaging of a target bar code 34 at far target distances TD.

In an exemplary embodiment of the aiming pattern assembly 60, the focusing lens 62 is a convex focusing lens having a focal length in a range of 2-5 mm. and, preferably, 3 mm. If the focusing lens optical axis FLOA is laterally offset a distance OS=10 mm. from the imaging lens assembly optical axis OA, the center point CP' of interest is at a target distance TD' of 100 mm. from the imaging lens assembly 60, and if the lateral offset d between the second laser chip 64 and the focusing lens optical axis FLOA is 300 micrometers (um.), then, as shown in FIG. 9, the parallax angle $\alpha$ of the second aiming pattern beam line BL2 has a desired value of 0.1 radians≈5.73°.

The aiming patterns P1, P2 may be a simple dot-type aiming pattern. A dot aiming pattern is an aiming pattern that projects upon a target object as a simple, generally circular pattern of laser light whose respective geometric centers are congruent with the respective beam lines BL1, BL2. The aiming dots of aiming patterns P1, P2 are schematically shown as D1, D2 respectively in FIGS. 10 and 11.

Alternatively, as is discussed below with respect to a third exemplary embodiment 260 of the aiming pattern assembly, by adding an aiming pattern generating element 270, such as a refractive optical element (ROE) and/or a diffractive optical element (DOE), in addition to the focusing lens, the aiming patterns P1, P2 may be block-type aiming patterns having horizontal and vertical extents, e.g., an aiming pattern comprising a line, a circle, a crosshairs, or a rectangle of visible illumination. For example, with proper selection of the focusing lens and an aiming pattern generating element, at intersection point I2, the second aiming pattern P2 may be generated to have a size and position that would be substantially congruent with the extents FVH, FVV of the field of view FV.

Figure 9:
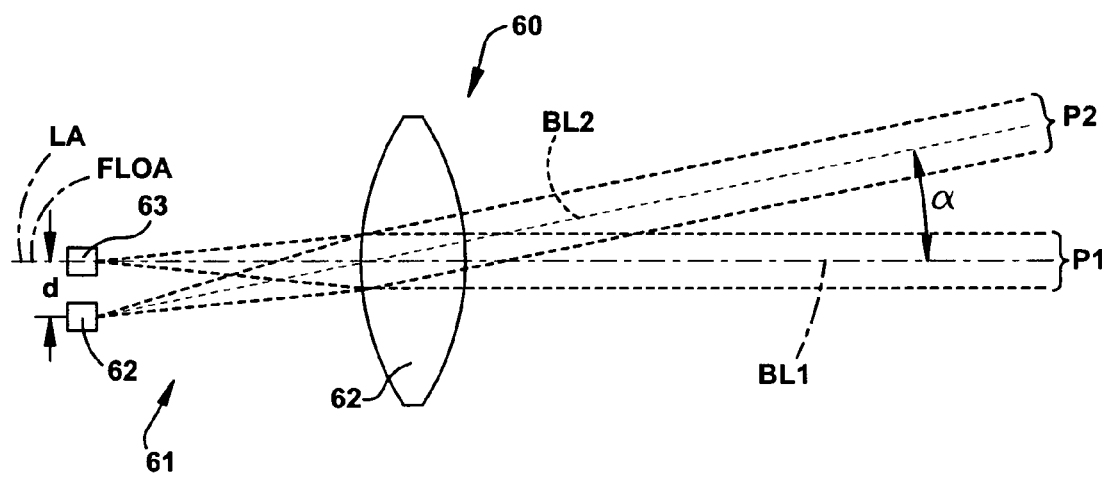
FIG. 9 is an enlarged side elevation view of selected portions of a first exemplary embodiment of an aiming pattern assembly of the present invention capable of generating a plurality of visible aiming patterns.

Even with aiming dots D1, D2, unlike a true geometric point or lines, the aiming patterns P1, P2 have some horizontal and vertical dimensions or extent and, thus, in FIG. 9, are shown schematically by solid lines representative of an "envelope" of the aiming pattern illumination of P1, P2, with the beam lines BL1, BL2 being in the geometric center of the illumination "envelopes". The particular circular size of the dot aiming patterns D1, D2 will depend on the characteristics of the laser chips 63, 64, the focusing lens 62 and the target distance TD to target bar code 34 that that aiming pattern is projected upon.

It should be appreciated that three, four or more laser chips or laser arrays can be used in conjunction to generate multiple aiming patterns each having a different parallax angle $\alpha$. Thus, for example, if three laser chips were utilized, the working range WR would be divided up into a near working range, an intermediate working range, and a far working range. A different aiming pattern would be used for each of the three working ranges.

Advantageously, determination of whether the target bar code 34 is within the working range WR and, if so, whether it is within the near working range NWR or the far working range FWR of the field of view FV is determined by the imaging system 12, for example, by a laser ranging system 50 of the imaging system 12. A laser ranging system may be part of an automatic focusing system for an imaging-based bar code reader with a variable focus imaging lens assembly. One suitable example of an automatic focusing system that includes laser ranging circuitry and uses a laser beam aiming pattern to find a target range of a bar code, the target range extending from a sensor array 28 of the imaging system to the bar code, and then adjusts a moving lens of a variable focus imaging lens assembly based on determined target range is found in U.S. Pat. No. 7,303,131, issued Dec. 4, 2007 to Carlson et al. and entitled "Automatic Focusing System for Imaging-Based Bar Code Reader." The '131 patent is assigned to the assignee of the present invention and is incorporated herein in its entirety by reference.

The laser ranging system 50 may be part of the imaging system circuitry 22 or it may be embodied in separate circuitry/software that is separate from but electrically coupled to the imaging system circuitry 22, the microprocessor 11a and the memory 84. In one exemplary embodiment, the focusing system 50 may momentarily energize both laser light sources 63, 64 for improving accuracy of a range finding algorithm utilized by the laser ranging system 50. Assuming both aiming patterns P1, P2 are actuated by the laser ranging system 50, a differential distance (shown as distance dd in FIG. 11) between the two aiming dots D1, D2, when imaged by the imaging system 12, provides range information to the laser ranging system 50.

Knowing the target distance, the laser ranging system 50 can determine if the target bar code 34 is in the near working range NWR, the far working range FWR or beyond the far working range, and can accordingly decide whether to keep the first aiming pattern P1 actuated and turn the second aiming pattern P2 off, or vice versa. Advantageously, a bar code reader that utilizes an automatic focus/automatic zoom (AF/AZ) imaging system may also use the differential distance range dd provided by the simultaneous use of the two laser aiming patterns P1, P2 to rapidly arrive at a desired focusing position or desired zoom setting.

More generally, if the target bar code 34 is determined by the laser ranging/focusing system 50 of the imaging system 12 to be within the near working range NWR, the aiming pattern P1 will be activated by the imaging system 12 to aid the user in properly aiming the reader housing 16 at the target bar code 34. On the other hand, if the target bar code 34 is determined to be within the far working range FWR, the aiming pattern P2 will be activated by the imaging system 12 to aid the user in properly aiming the reader housing 16 at the target bar code 34. Since the center line CP1 of the first aiming pattern P1 is more congruent with the field of view center line CFV over the near working range NWR and the second aiming pattern P2 is more congruent with the field of view center line CFV over the far working range, the use of two aiming patterns reduces or mitigates aiming error resulting from offset and parallax of the aiming pattern assembly 60 and the imaging system 12.

Alternately, the imaging system 12 could provide the capability for the user of the reader select between aiming patterns P1 and P2 using an input such as the trigger 16e, if it was deemed that the user would be able to accurately judge whether the target bar code 34 was within the near working range NWR or the far working range FWR of the reader 10.

To avoid having either the aiming pattern P1, P2 appear in captured image frames 74 that are to be analyzed for the presence of an imaged target bar code 34a, the aiming pattern assembly 60 is disabled when the imaging system 12 images the target bar code 34. Alternately, if it is desired to have the aiming pattern on during a portion or portions of an imaging session to facilitate aiming the reader during the pendency of an imaging session, those captured image frames 74 that are generated during the activation of either of the two aiming pattern P1, P2 are not analyzed, instead are discarded.

Second Exemplary Embodiment of Aiming Pattern Assembly 160

Figure 13:
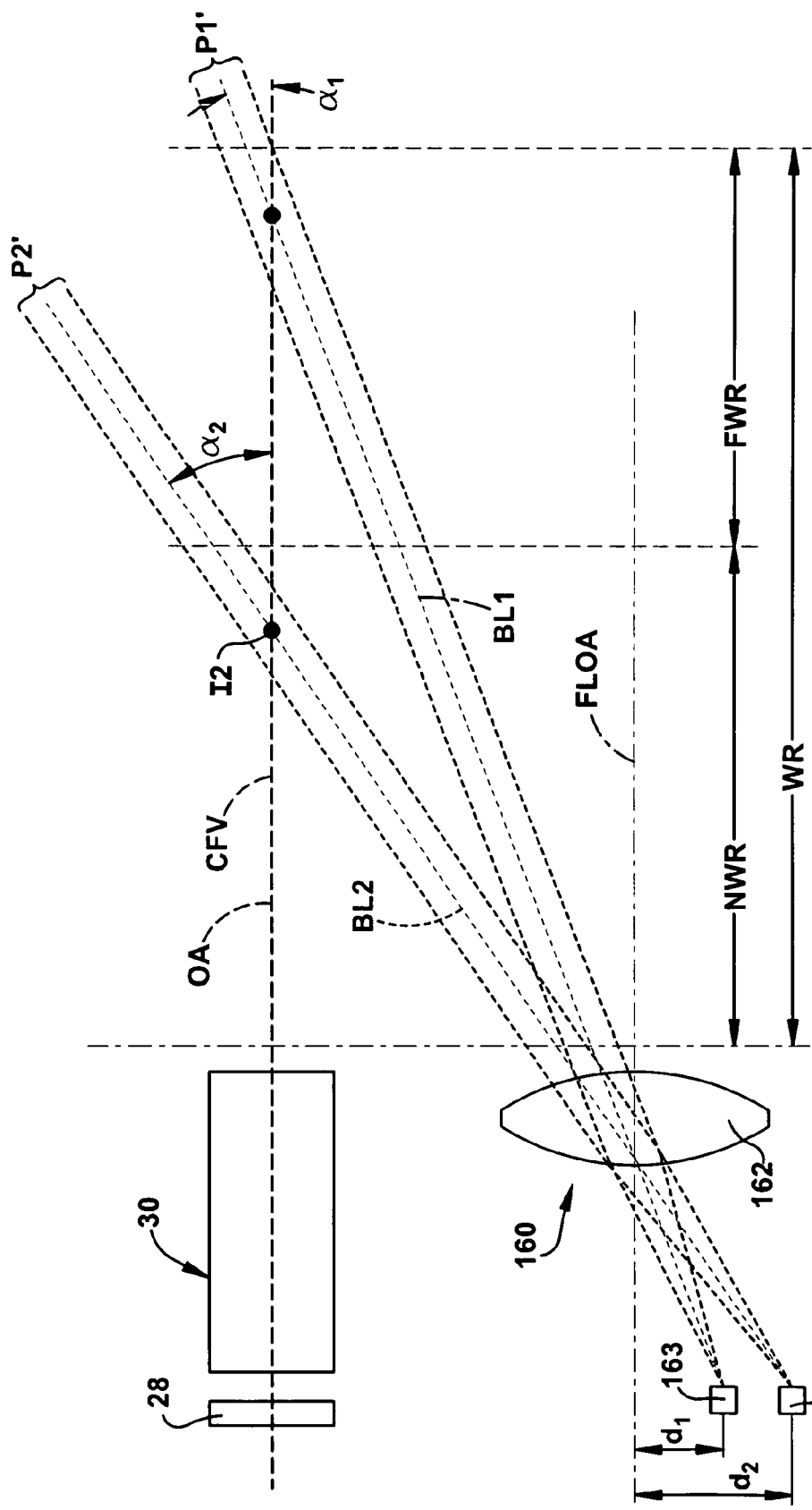
FIG. 13 is a schematic side elevation view of selected portions of a second exemplary embodiment of an aiming pattern assembly of the present invention wherein both laser light sources are offset from an optical axis of a focusing lens.

A second exemplary embodiment of an aiming pattern assembly of the present invention is shown schematically at 160 in FIG. 13. In this embodiment, a parallax angle $\alpha$ of both the first and second aiming patterns P1', P2' is nonzero, that is, both aiming patterns P1', P2' both angle toward and ultimately intersect or cross the imaging lens assembly optical axis OA and the field of view center line CFV.

As in the first embodiment, the aiming pattern assembly 160 includes a laser assembly 161 and a focusing lens 162. The laser assembly 161 is laterally offset from the optical axis OA of the imaging lens assembly 30. The laser assembly 161 comprises a first and second laser light sources 163, 164, both of which are offset from the optical axis FLOA of the focusing lens 162. The first laser light source 163 is laterally offset a distance d1 from the focusing lens optical axis FLOA and the second laser light source 164 is laterally offset a distance d2 from the focusing lens optical axis FLOA. Light emitted by the first laser light source 163 upon passing through and being focused by the focusing lens 162 generates a first aiming pattern P1' that extends along a first beam line BL1' and light emitted by the second laser light source 164 upon passing through and being focused by the focusing lens 162 generates a second aiming pattern P2' that extends along a second beam line BL2'.

As can be seen in FIG. 13, the lateral offset distance d2 of the second laser light source 164 is greater than the lateral offset distance d1 of the first laser light source 163. Accordingly, while both the first and second aiming patterns P1', P2' both angle toward and intersect or cross the imaging lens assembly optical axis OA at points I1, I2 respectively, the second aiming pattern P2' has a sharper angle toward the imaging lens assembly optical axis OA than aiming pattern P1', that is, the parallax angle α2 of the second aiming pattern P2' is greater than the parallax angle α1 of the first aiming pattern P1'. With proper selection of the distances d1 and d1, as can be seen in FIG. 13, advantageously, the first aiming pattern P1' intersects or crosses the imaging lens assembly optical axis OA at I1 within the bounds of the far working range FWR while the second aiming pattern P2' intersects or crosses the imaging lens assembly optical axis OA at I2 within the bounds of the near working range NWR.

Thus, unlike the first embodiment, instead of the first aiming pattern P1 being substantially parallel of the imaging lens assembly optical axis OA and the field of view center line CFV, in the present embodiment, the first aiming pattern P1' intersects or crosses the imaging lens optical axis OA and the field of view center line CFV within the far working range FWR. As in the previous embodiment, the second aiming pattern P2' intersects or crosses the imaging lens optical axis OA and the field of view center line CFV within the near working range NWR.

Third Exemplary Embodiment of Aiming Pattern Assembly 260

Figure 14:
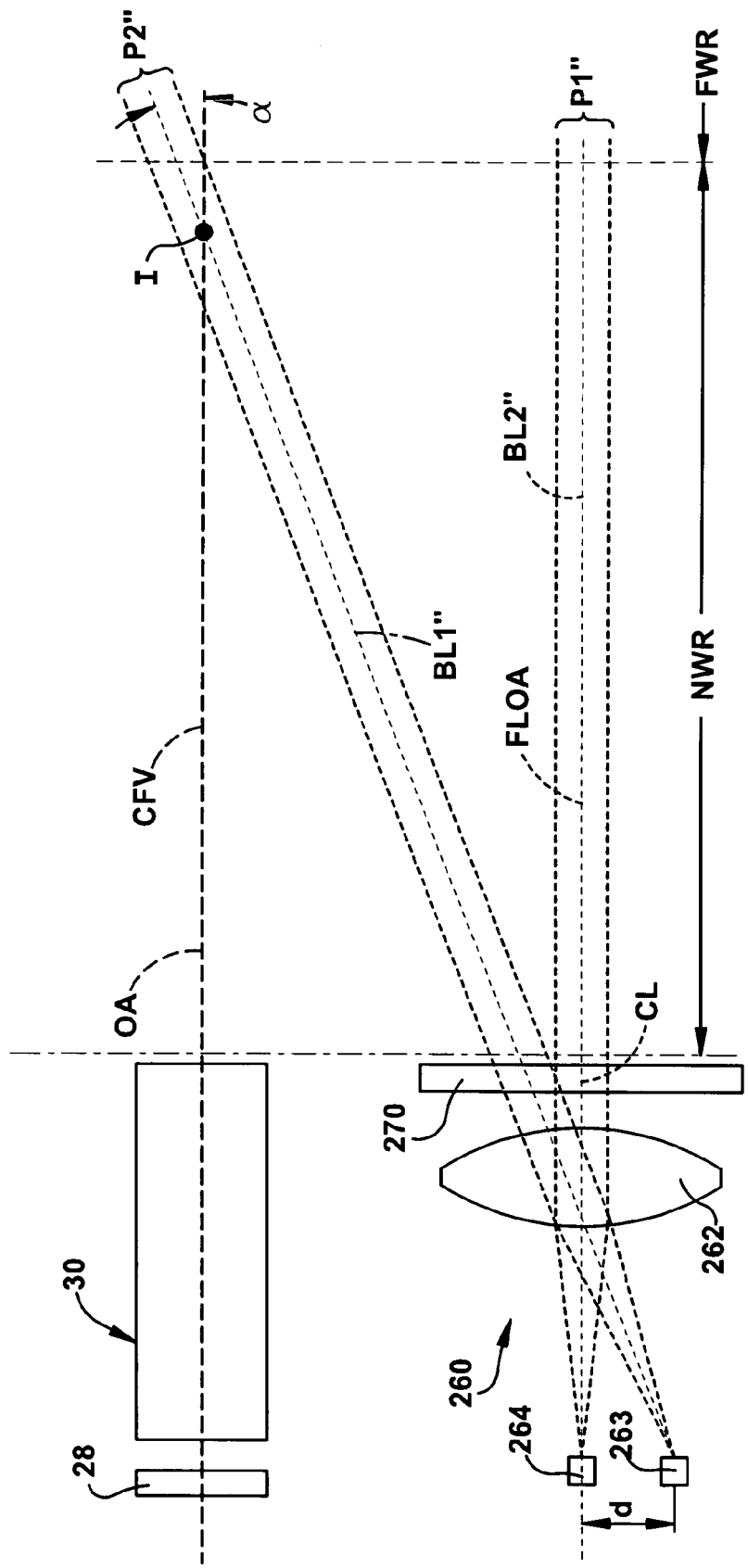
FIG. 14 is a schematic side elevation view of selected portions of a third exemplary embodiment of an aiming pattern assembly of the present invention wherein the aiming pattern assembly includes an aiming pattern generating element.
Figure 15:
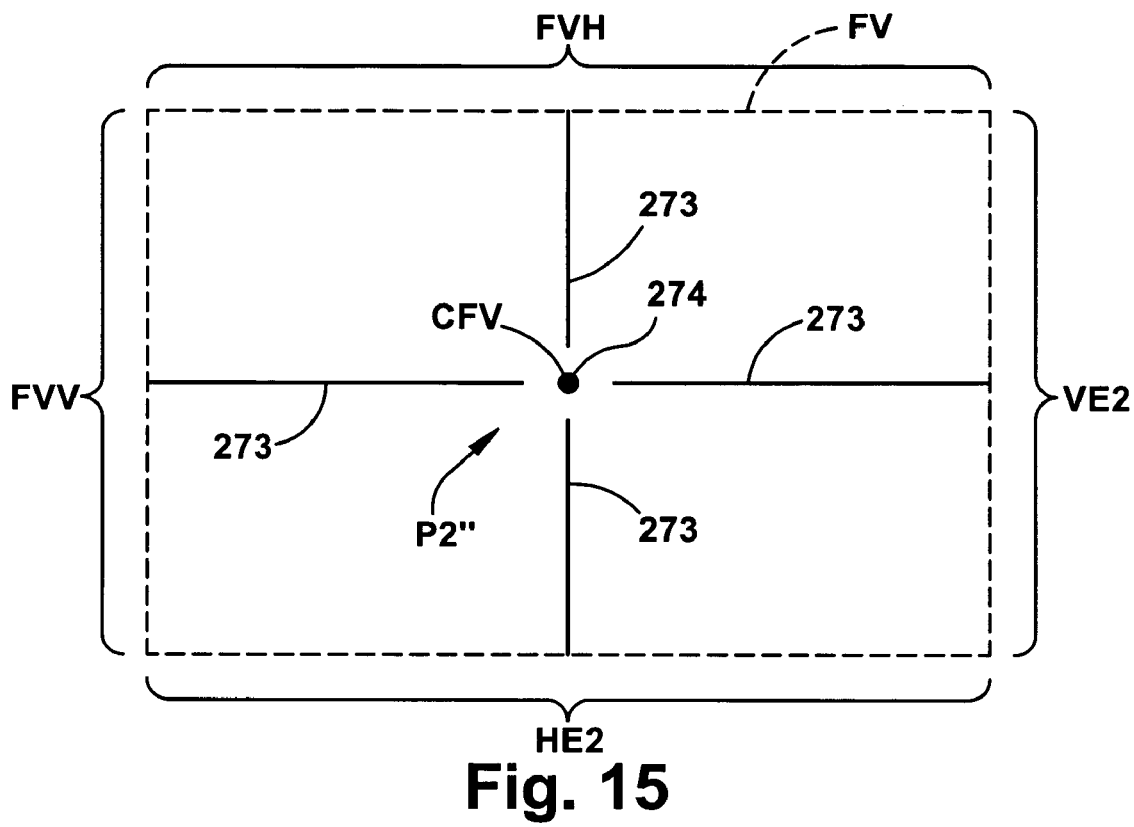
FIG. 15 is a schematic representation of the field of view at a near imaging distance and illustrating projections of first and second aiming patterns of the third exemplary embodiment of the aiming pattern assembly onto the imaging distance field of view.
Figure 16:
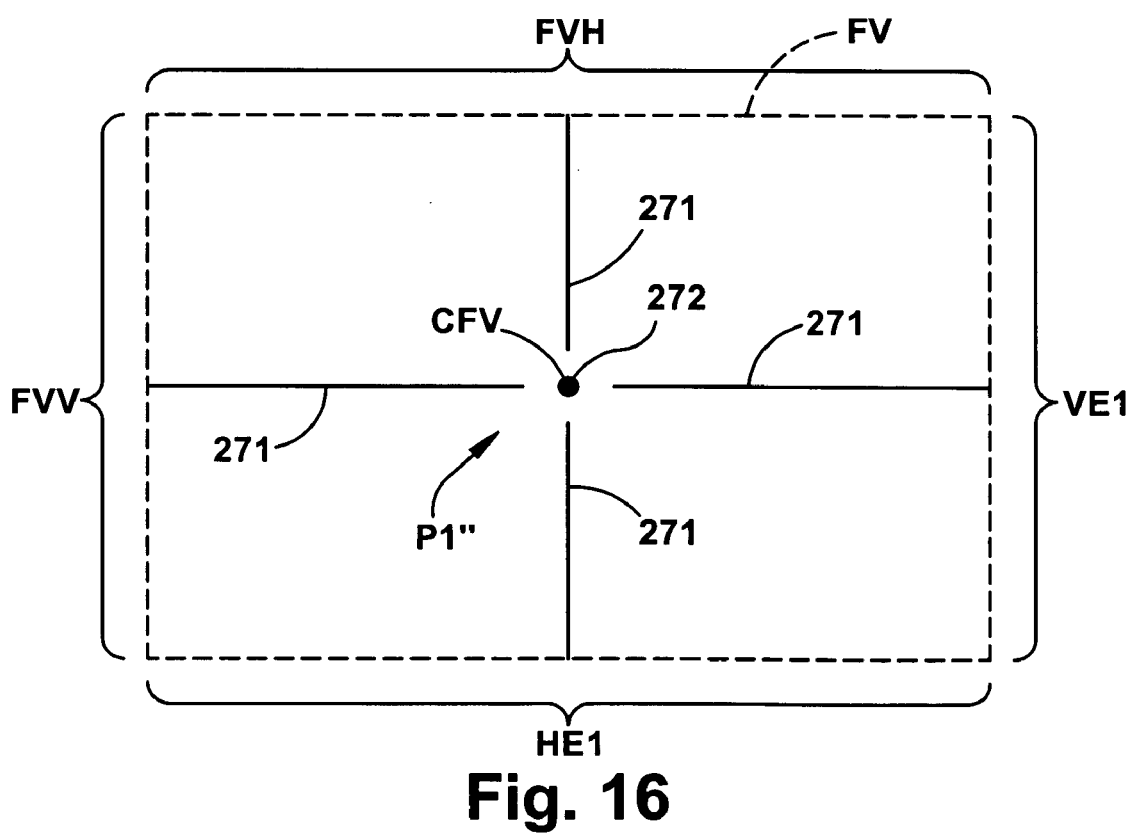
FIG. 16 is a schematic representation of the field of view at a far imaging distance and illustrating projections of first and second aiming patterns of the third exemplary embodiment of the aiming pattern assembly onto the far distance field of view.

A third exemplary embodiment of an aiming pattern assembly of the present invention is shown schematically at 260 in FIGS. 14-16. Unlike the first two embodiments, the third embodiment includes an aiming pattern generating element 270, such as a diffractive optical element (DOE) or a refractive optical element (ROE), to generate block-type aiming patterns, that is, aiming patterns that have a horizontal and vertical extent, not simply a dot-type aiming pattern.

As in the first embodiment, the aiming pattern assembly 260 includes a laser assembly 261 and a focusing lens 262. Additionally, the aiming pattern assembly 260 includes the aiming pattern generating element 270, for example, a diffractive optical element (DOE) and/or a refractive optical element (ROE). Discussion of the use of refractive and diffractive optical elements in connection with generation of laser aiming pattern assemblies is found in U.S. application Ser. No. 11/931,827, filed Oct. 31, 2007, to Gurevich et al. and entitled "Multi-Segmented Aiming Diffractive Optical Elements". The '827 application is assigned to the assignee of the present invention and is incorporated herein in its entirety by reference. The '827 application teaches several embodiments of aiming pattern generating elements that include both DOEs and ROEs in different portions of the element for use in an aiming pattern assembly for an imaging-based bar code reader. Also incorporated by reference herein in its entirety is U.S. Pat. No. 7,182,260, issued Feb. 27, 2007 to Gurevich et al. and assigned to the assignee of the present invention. The '260 patent teaches the use of a refractive optical element as an aiming pattern generating element. Also incorporated by reference herein in its entirety is U.S. Pat. No. 6,060,722, issued May 9, 2000 to Havens et al. The '722 patent teaches the use of a diffractive optical element as an aiming pattern generating element.

In the aiming pattern assembly 260, the laser assembly 261 comprises first and second laser light sources 263, 264. The first light source 263 is aligned with the optical axis FLOA of the focusing lens 262 and a center line/optical axis CL (FIG. 14) of the aiming pattern generating element 270. The second light source 264 is laterally offset a distance d from both the focusing lens optical axis FLOA and the aiming pattern generating element center line/optical axis CL.

Light emitted by the first laser light source 263 upon passing through and being focused by the focusing lens 262 and passing through and being diffracted/refracted by the aiming pattern generating element 270 generates a first aiming pattern P1" that extends along a first beam line BL1. The first aiming pattern, in one exemplary embodiment, includes a crosshairs 271 and a central dot 272. The first beam line BL1" is substantially parallel to the imaging lens assembly optical axis OA and the field of view center line CFV.

Light emitted by the second laser light source 264 upon passing through and being focused by the focusing lens 162 and passing through and being diffracted/refracted by the aiming pattern generating element 270 generates a second aiming pattern P2" that extends along a second beam line BL2. The second aiming pattern P2", in one exemplary embodiment, includes a crosshairs 273 and a central dot 274. The second beam line BL2" angles toward and intersects or crosses the imaging lens assembly optical axis OA and the field of view center line CFV at crossing point I. The second beam line BL2" extends at a non-zero parallax angle α. As can be seen in FIG. 14, the intersection or crossing point I second aiming pattern P2" is at a near imaging distance, specifically, within the near working range NWR of the imaging lens assembly 30.

Optionally, as can best be seen schematically in FIG. 15, the optical characteristics and relative distances of the laser light sources 263, 264, the focusing lens 262 and the aiming pattern generating element 270 are configured such that a vertical extent VE2 and a horizontal extent HE2 of the second aiming pattern P2" matches a vertical and horizontal extent FVV, FVH, respectively of the field of view FV at the intersection point I (FIG. 14) of the near working range NWR so that the operator viewing the crosshairs 273 of aiming pattern P2" when imaging a target bar code 34 at a near distance has an approximate visual indication of an extent of the imaging lens assembly field of view within the near working range NWR.

Similarly, optionally, as can best be seen schematically in FIG. 16, the optical characteristics and relative distances of the laser light sources 263, 264, the focusing lens 262 and the aiming pattern generating element 270 are configured such that a vertical extent VE1 and a horizontal extent HE1 of the first aiming pattern P1" matches a vertical and horizontal extent FVV, FVH, respectively of the field of view FV at a point, say point P (FIG. 14), within the far working range FWR so that the operator viewing the crosshairs 271 when imaging a target bar code 34 at a far distance has an approximate visual indication of an extent of the imaging lens assembly field of view within the far working range FWR.

It should be understood, of course, that is in the second embodiment, the first laser source 263 and the second laser source 264 may both be offset laterally from the focusing lens optical axis FLOA and the center line/optical axis of the aiming pattern generating element 270 such that both have a non-zero parallax angle. In such an embodiment, a lateral offset distance d2 of the second laser light source 264 with respect to the focusing lens optical axis FLOA would be greater than a lateral offset distance d1 of the first laser light source 263 with respect to the focusing lens optical axis FLOA such that a parallax angle $\alpha 2$ of the second aiming pattern P2" would be greater than a parallax angle $\alpha 1$ of the first aiming pattern P1". With proper selection of the distances d1 and d1, the first aiming pattern P1" would intersect or cross the imaging lens assembly optical axis OA at a point within the bounds of the far working range FWR while the second aiming pattern P2" would intersect or cross the imaging lens assembly optical axis OA at a point within the bounds of the near working range NWR.

While the present invention has been described with a degree of particularity, it is the intent that the invention includes all modifications and alterations from the disclosed design falling with the spirit or scope of the appended claims.

We claim:

1. An imaging system for an imaging-based bar code reader adapted to image a target bar code within a field of view of the imaging system, the imaging system comprising:
 a sensor array and an imaging lens assembly defining an imaging lens assembly optical axis and focusing light from the field of view onto the sensor array, the imaging system defining a working range over which a target bar code within the field of view is capable of being imaged and decoded, the working range being subdivided into a near working range and a non-overlapping far working range, the near working range being closer to the imaging lens assembly than the far working range being further from the imaging lens assembly; and
 an aiming pattern assembly including a laser assembly laterally offset from the imaging lens assembly optical axis, the laser assembly including a first laser light source and a second laser light source, the aiming pattern assembly including a focusing lens defining a focusing lens optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis resulting in the first beam path being substantially parallel to the imaging lens assembly optical axis and the second laser light source being laterally offset from the focusing lens optical axis resulting in the second beam path crossing the imaging lens assembly optical axis in the near working range.

2. The imaging system of claim 1 wherein the laser assembly comprises a dual laser package wherein the first and second laser light sources are mounted a common cantilever.

3. The imaging system of claim 1 wherein the first laser light source is a laser chip generating illumination at a wavelength in a range of 400-470 nanometers.

4. The imaging system of claim 1 wherein the second laser light source is a laser chip generating illumination at a wavelength in a range of 630-670 nanometers.

5. The imaging system of claim 1 wherein the focusing lens has a focal length in a range of 2-5 millimeters.

6. The imaging system of claim 5 wherein the focusing lens focal length is 3 millimeters and first laser light source is laterally offset from the focusing lens optical axis by 300 micrometers to achieve a parallax angle of substantially 0.1 radians at a range of 100 mm from the imaging lens assembly.

7. The imaging system of claim 1 further including a focusing system coupled to the aiming pattern assembly, the focusing system selectively energizing the first or second aiming patterns depending on a distance between the imaging system and a target bar code.

8. The imaging system of claim 7 where in the focusing system energizes the first and second aiming patterns in determining the distance between the imaging system and a target bar code.

9. The imaging system of claim 1 wherein the near working range is a range of 10 inches or less from the imaging lens assembly.

10. The imaging system of claim 1 wherein the aiming pattern assembly further includes an aiming pattern generating element including at least one of a refractive optical element and a diffractive optical element which focuses first and second aiming patterns into block-type aiming patterns having a vertical extent and a horizontal extent.

11. The imaging system of claim 10 wherein the second aiming pattern has a vertical extent and a horizontal extent that is substantially congruent with a vertical extent and a horizontal extent of the imaging system field of view at a point in the near working range.

12. An aiming pattern assembly for an imaging-based bar code reader wherein the bar code reader includes an imaging system generating image frames of a target object within a field of view, the field of view having a center point, the imaging system including an imaging lens assembly defining an optical axis and a working range over which a target bar code within the field of view is capable of being imaged and decoded, the working range being subdivided into a near working range and a non-overlapping far working range, the near working range being closer to the reader than the far working range being further from the reader, the aiming pattern assembly comprising:
 a laser assembly laterally offset from the imaging lens assembly optical axis, the laser assembly including a first laser light source and a second laser light source; and
 a focusing lens defining an optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis resulting in the first beam path being substantially parallel to the imaging lens assembly optical axis and the second laser light source being laterally offset from the focusing lens optical axis resulting in the second beam path crossing the imaging lens assembly optical axis in the near working range.

13. The aiming pattern assembly of claim 12 wherein the laser assembly comprises a dual laser package wherein the first and second laser light sources are mounted a common cantilever.

14. The aiming pattern assembly of claim 12 wherein the first laser light source is a laser chip generating illumination at a wavelength of approximately 405 nanometers.

15. The aiming pattern assembly of claim 12 wherein the second laser light source is a laser chip generating illumination at a wavelength of approximately 650 nanometers.

16. The aiming pattern assembly of claim 12 wherein the focusing lens has a 3 millimeter (mm.) focal length.

17. The aiming pattern assembly of claim 16 wherein the first laser light source is laterally offset from the focusing lens optical axis by 300 micrometers to achieve a parallax angle of substantially 0.1 radians at a range of 100 mm from the imaging lens assembly.

18. The aiming pattern assembly of claim 12 wherein the near working range is 20 inches or less from the imaging lens assembly.

19. The aiming pattern assembly of claim 12 wherein the aiming pattern assembly further includes an aiming pattern generating element including at least one of a refractive optical element and a diffractive optical element which focuses first and second aiming patterns into block-type aiming patterns having a vertical extent and a horizontal extent.

20. The aiming pattern assembly of claim 19 wherein the second aiming pattern has a vertical extent and a horizontal extent that is substantially congruent with a vertical extent and a horizontal extent of the imaging system field of view at a point in the near working range.

21. An imaging-based bar code reader comprising:
an imaging system generating image frames of a target object within a field of view of the imaging system, the imaging system including a sensor array and an imaging lens assembly defining an imaging lens assembly optical axis and focusing light from the field of view onto the sensor array, the imaging lens assembly defining a working range over which a target bar code within the field of view is capable of being imaged and decoded, the working range being subdivided into a near working range and a non-overlapping far working range, the near working range being closer to the imaging lens assembly than the far working range being further from the imaging lens assembly; and
an aiming pattern assembly including a laser assembly laterally offset from the imaging lens assembly optical axis, the laser assembly including a first laser light source and a second laser light source, the aiming pattern assembly including a focusing lens defining a focusing lens optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis resulting in the first beam path being substantially parallel to the imaging lens assembly optical axis and the second laser light source being laterally offset from the focusing lens optical axis resulting in the second beam path crossing the imaging lens assembly optical axis in the near working range.

22. The imaging-based bar code reader of claim 21 further including a focusing system coupled to the aiming pattern assembly and selectively energizing the first or second aiming patterns depending on a distance between the imaging system and a target bar code.

23. A method of generating an aiming pattern to facilitate the aiming of an imaging-based bar code reader at a target bar code wherein the bar code reader includes an imaging system generating image frames of a target object within a field of view, the field of view having a center point, the imaging system including an imaging lens assembly defining an optical axis having a working range over which a target bar code within the field of view is capable of being imaged and decoded, the working range being subdivided into a near working range and a non-overlapping far working, the near working range being closer to the reader than the far working range being further from the reader, the steps of the method comprising:
providing an aiming pattern assembly including: a laser assembly laterally offset from the imaging lens assembly optical axis, the laser assembly including a first laser light source and a second laser light source; and a focusing lens defining an optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being aligned with the focusing lens optical axis resulting in the first beam path being substantially parallel to the imaging lens assembly optical axis and the second laser light source being laterally offset from the focusing lens optical axis resulting in the second beam path crossing the imaging lens assembly optical axis in the near working range;
determining if a target bar code is within the near range or the far range of the working range; and
energizing the first aiming pattern if the target bar code is determined to be within the far working and energizing the second aiming pattern if the target bar code is determined to be within the near working range.

24. An imaging system for an imaging-based bar code reader adapted to image a target bar code within a field of view of the imaging system, the imaging system comprising:
a sensor array and an imaging lens assembly defining an imaging lens assembly optical axis and focusing light from the field of view onto the sensor array, the imaging system defining a working range over which a target bar code within the field of view is capable of being imaged and decoded, the working range being subdivided into a near working range and a non-overlapping far working range, the near working range being closer to the imaging lens assembly than the far working range being further from the imaging lens assembly; and
an aiming pattern assembly including a laser assembly laterally offset from the imaging lens assembly optical axis, the laser assembly including a first laser light source and a second laser light source, the aiming pattern assembly including a focusing lens defining a focusing lens optical axis and positioned proximate to the laser assembly, the focusing lens focusing the laser light generated by the first laser light source to generate a first aiming pattern traversing along a first beam path and focusing the laser light generated by the second laser light source to generate a second aiming pattern traversing along a second beam path, the first laser light source being laterally offset from the focusing lens optical axis resulting in the first beam path crossing the imaging lens assembly optical axis in the far working range and the second laser light source being laterally offset from the focusing lens optical axis resulting in the second beam path crossing the imaging lens assembly optical axis in the near working range.

25. The imaging system of claim 24 wherein a distance that the second laser light source is laterally offset from the focusing lens optical axis is greater than a distance that the first laser light source is laterally offset from the focusing lens optical axis.

26. The imaging system of claim 24 wherein the aiming pattern assembly further includes an aiming pattern generating element including at least one of a refractive optical element and a diffractive optical element which focuses first and second aiming patterns into block-type aiming patterns having a vertical extent and a horizontal extent.

27. The imaging system of claim 24 wherein the second aiming pattern has a vertical extent and a horizontal extent that is substantially congruent with a vertical extent and a horizontal extent of the imaging system field of view at a point in the near working range.

28. The imaging system of claim 24 wherein the aiming pattern assembly further includes an aiming pattern generating element including at least one of a refractive optical element and a diffractive optical element which focuses first and second aiming patterns into block-type aiming patterns having a vertical extent and a horizontal extent.

* * * * *

UNITED STATES PATENT AND TRADEMARK OFFICE
CERTIFICATE OF CORRECTION

| | |
|---|---|
| PATENT NO. | : 8,087,587 B2 |
| APPLICATION NO. | : 12/343712 |
| DATED | : January 3, 2012 |
| INVENTOR(S) | : Vinogradov et al. |

It is certified that error appears in the above-identified patent and that said Letters Patent is hereby corrected as shown below:

In Column 4, Line 4, delete "lense" and insert -- lens --, therefor.

In Column 12, Line 63, delete "(www.rohnm.comn)." and insert -- (www.rohm.com). --, therefor.

In Column 17, Line 30, delete "d1 and d1," and insert -- d1 and d2, --, therefor.

In Column 19, Line 18, delete "d1 and d1," and insert -- d1 and d2, --, therefor.

In Column 20, Line 16, in Claim 8, delete "where in" and insert -- wherein --, therefor.

Signed and Sealed this
Eighteenth Day of December, 2012

David J. Kappos
*Director of the United States Patent and Trademark Office*